(12) United States Patent
Kaneko et al.

(10) Patent No.: US 7,179,728 B2
(45) Date of Patent: Feb. 20, 2007

(54) OPTICAL COMPONENT AND MANUFACTURING METHOD THEREOF, MICROLENS SUBSTRATE AND MANUFACTURING METHOD THEREOF, DISPLAY DEVICE, AND IMAGING DEVICE

(75) Inventors: Tsuyoshi Kaneko, Shimosuwa-machi (JP); Satoshi Kito, Suwa (JP); Tetsuo Hiramatsu, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/649,891

(22) Filed: Aug. 28, 2003

(65) Prior Publication Data

US 2004/0106223 A1 Jun. 3, 2004

(30) Foreign Application Priority Data

Sep. 25, 2002 (JP) ............................. 2002-279064

(51) Int. Cl.
*H01L 21/20* (2006.01)
(52) U.S. Cl. ................. 438/492; 257/E21.135
(58) Field of Classification Search .................. 438/6, 438/7, 10, 22, 28–32, 65, 70, 99, 492–493, 438/497, 674; 427/76
See application file for complete search history.

(56) References Cited

U.S. PATENT DOCUMENTS

| | | | |
|---|---|---|---|
| 4,689,291 A | 8/1987 | Popovic et al. | |
| 5,229,016 A | 7/1993 | Hayes et al. | |
| 5,707,684 A | 1/1998 | Hayes et al. | |
| 5,846,694 A | 12/1998 | Strand et al. | |
| 6,060,113 A * | 5/2000 | Banno et al. | 427/78 |
| 6,402,403 B1 * | 6/2002 | Speakman | 400/120.03 |
| 6,713,389 B2 * | 3/2004 | Speakman | 438/674 |
| 6,761,925 B2 * | 7/2004 | Banno et al. | 427/78 |
| 6,838,361 B2 * | 1/2005 | Takeo | 438/493 |
| 7,040,741 B2 | 5/2006 | Nakamura et al. | |
| 2001/0033712 A1 | 10/2001 | Cox et al. | |
| 2001/0048968 A1 | 12/2001 | Cox et al. | |
| 2002/0094419 A1 | 7/2002 | Lin et al. | |
| 2003/0076378 A1 | 4/2003 | Nakamura et al. | |

FOREIGN PATENT DOCUMENTS

| | | |
|---|---|---|
| CN | 1205096 A | 1/1999 |
| CN | A 1369721 | 9/2002 |
| EP | 0 932 081 A1 | 7/1999 |

(Continued)

OTHER PUBLICATIONS

Hayes, D. J. et al. "Ink-jet printing in the manufacturing of electronics, photonics, and displays." *Nanoscale Optics and Applications*, vol. 4809, pp. 94-99, Jul. 2002.

(Continued)

*Primary Examiner*—Michael Lebentritt
*Assistant Examiner*—Andre' Stevenson
(74) *Attorney, Agent, or Firm*—Oliff & Berridge, PLC

(57) ABSTRACT

The invention provides an optical component whose siting, shape and size are well controlled and a method of manufacturing such an optical component. The optical component of the present invention includes a base member disposed on a substrate, and an optical member disposed on the top surface of the base member.

20 Claims, 21 Drawing Sheets

FOREIGN PATENT DOCUMENTS

| | | |
|---|---|---|
| EP | 0 981 168 A2 | 2/2000 |
| EP | 0 862 156 B1 | 4/2005 |
| JP | A 62-83337 | 4/1987 |
| JP | A 2-165932 | 6/1990 |
| JP | A 08-082759 | 3/1996 |
| JP | A 09-246658 | 9/1997 |
| JP | A 11-311731 | 11/1999 |
| JP | A 2000-2802 | 1/2000 |
| JP | A 2000-108216 | 4/2000 |
| JP | A 2000-199805 | 7/2000 |
| JP | A 2000-280367 | 10/2000 |
| JP | A 3-198003 | 8/2001 |
| JP | A 2001-208958 | 8/2001 |
| JP | A 2001-518206 | 10/2001 |
| JP | A 2002-169004 | 6/2002 |
| JP | A 2002-202426 | 7/2002 |
| JP | A 2002-221617 | 8/2002 |
| JP | A 2002-225259 | 8/2002 |
| JP | A 2002-331532 | 11/2002 |
| JP | A 2003-240911 | 8/2003 |
| KR | 2003-0035892 A | 5/2003 |

OTHER PUBLICATIONS

Database Inspec Online; XP 002339770.

* cited by examiner (a)

(b)

(c)

(a)

(b)

(c)

(d)

(e)

(a)

(b)

(a)

(b)

(c)

(d)

(e)

(a)

(b)

(c)

(d)

(e)

OPTICAL COMPONENT AND MANUFACTURING METHOD THEREOF, MICROLENS SUBSTRATE AND MANUFACTURING METHOD THEREOF, DISPLAY DEVICE, AND IMAGING DEVICE

BACKGROUND OF THE INVENTION

1. Field of Invention

The present invention relates to an optical component whose siting, shape and size are well controlled and to a method of manufacturing such an optical component. The present invention also relates to a microlens substrate and its manufacturing method, a display device, and an imaging device.

2. Description of Related Art

In a related art method of manufacturing an optical member, such as a lens, for example, a droplet including a liquid material is ejected onto a substrate, then cured. With this method, however, it is difficult to obtain an optical member having a properly adjusted focal length, because the shape of the optical member that is formed is constrained by the contact angle between the droplet and the substrate.

The related art also includes methods, for example, of forming an optical member of the desired shape by adjusting the wettability of the substrate surface (for example, as disclosed in Japanese Laid Open to the Public No. Hei 2-165932, and Japanese Laid Open to the Public No. 2000280367).

However, these methods are not adequate to strictly control the shape, size, and siting of the optical member.

SUMMARY OF THE INVENTION

The present invention provides an optical component whose siting, shape and size are well controlled and to provide a method of manufacturing such an optical component.

The present invention also provides a microlens substrate and a method of manufacturing the microlens substrate, where the siting, shape and size of the lens is well controlled, and to provide a display device and/or imaging device equipped with the microlens substrate.

1. Optical Component

The optical component of the present invention includes a base member disposed upon a substrate, and an optical member disposed upon the top surface of the base member.

Here, "substrate" refers to an object having a surface upon which the base member can be formed. The surface may be flat or may be curved, as long as the base member can be formed thereupon. Therefore, as long as it has such a surface, the shape of the substrate itself is not specifically prescribed. Moreover, the base member may also be formed so that it is integrated with the substrate.

Also, "base member" refers to a member having a top surface upon which the optical member can be formed, and "top surface of the base member" refers to the surface upon which the optical member is formed. The top surface of the base member may be flat or may be curved, as long as the optical member can be formed thereupon. In addition, "optical member" refers to a member having a function that changes the character or travel direction of light.

According to the present invention, by controlling the shape, height and other characteristics of the top surface of the base member by using the aforementioned configuration, it is possible to obtain an optical component that includes an optical member whose siting, shape and size are well-controlled. Details are provided of an exemplary embodiment below.

The optical component of the present invention can take any of the exemplary forms described below in (1) through (10).

(1) The base member can be made of a material that transmits light of a prescribed wavelength. Here, "transmit" refers to the entry of light incident on the base member and the subsequent exit of the light from the base member. It includes not only instances where all the light incident on the base member exits from the base member but also instances where only a portion of light incident on the base member exits from the base member.

(2) The optical member may function as a lens, a polarizing element, or a light-splitter.

(3) The optical member may be a spherical shape or may be an elliptical spherical shape.

(4) The optical member may be a sectioned spherical shape or may be a sectioned elliptical spherical shape.

Here, "sectioned spherical shape" refers to a shape obtained by sectioning a sphere on a single plane. In addition to perfect spheres, the sphere also includes shapes that approximate a sphere. Here, "sectioned elliptical spherical shape" refers to a shape obtained by sectioning a spherical ellipse on a single plane. In addition to perfect spherical ellipses, a spherical ellipse also includes shapes that are approximately spherical.

In this case, the section of the optical member may be a circle or an ellipse. Moreover, in this case the optical member may be provided with a function as a lens or as a polarizing element.

(5) The top surface of the base member is triangular, and the optical member is formed by ejecting a droplet on the top surface of the base member to form an optical member precursor, and by then curing the optical member precursor. In this case the optical member may be provided with a function as a polarizing element.

(6) The optical member may be formed by curing a liquid material that can be cured by adding energy.

In this case the optical member may be composed of an ultraviolet curing resin or of a thermosetting resin.

(7) The top surface of the base member may be one of any of a circle, an ellipse, or a triangle.

(8) The top surface of the base member may be a curved surface.

(9) The angle formed between the top surface of the base member and a surface in a side portion of the base member, which contracts the top surface, is an acute angle. Where the optical member is formed by ejecting a droplet to form an optical member precursor that is subsequently cured, this configuration can prevent the side surface of the base member from becoming wet by the droplet. As a result, it is possible to reliably form an optical member having the desired shape and size.

In this case, the upper part of the base member may form an inverse tapered shape. Here, "the upper part of the base member" refers to the region in the vicinity of the top surface of the base member. According to this configuration, if the optical member is formed by ejecting a droplet to form an optical member precursor that is then cured, the angle formed by the surface and side of the base member can be made smaller while maintaining the stability of the base member. Thus, this configuration can reliably prevent the side surface of the base member from becoming wet by the droplet. As a result, it is possible to more reliably form an optical member having the desired shape and size.

(10) The optical member is a micro lens and may function as a micro lens substrate.

In this case, the perimeter of the optical member is embedded using a sealing material. This enables the optical member to be reliably secured to the top surface of the base member.

2. Optical Component Manufacturing Method

A method of manufacturing an optical component of the present invention includes:

(a) forming a base member upon a substrate;

(b) ejecting a plurality of droplets on to the top surface of the base member to form an optical member precursor; and (c) curing the optical member precursor to form an optical member.

According to the present invention, by controlling the shape, height, siting and other characteristics of the top surface of the base member in the step of (a), and by, for example, controlling the volume of the ejected droplet in the step of (b), it is possible to form an optical component containing an optical member whose siting, shape and size are well controlled. Details will be provided in the description of the exemplary embodiment.

The method of manufacturing an optical component of the present invention can take any of the exemplary forms described below in (1)–(7).

(1) The base member in the step of (a) may be formed with a material that transmits light of a prescribed wavelength.

(2) The droplet in the step of (b) may be ejected using an inkjet method. Since an inkjet method allows the volume of the ejected droplet to be finely controlled, a very small optical member can be disposed simply and conveniently on the top surface of the base member.

(3) The optical member precursor described in the step of (c) can be cured by adding energy.

(4) The base member in the step of (a) may be formed so that an acute angle is formed between the top surface of the base member and a surface in a side portion of the base member, which contacts the top surface.

In this way, the side of the base member is able to prevent wetting by the droplet in the step of (b). As a result, it is possible to reliably form an optical member having the desired shape and size.

Herein, the upper part of the base member may form an inverse tapered shape in the step of (a). The angle formed between the top surface of the base member and a surface in a side portion of the base member, which contacts the top surface, can thus be made smaller while maintaining the stability of the base member. Hence it is possible to reliably prevent the side of the base member from becoming wet by the droplet in the step of (b). As a result, it is possible to more reliably form an optical member having the desired shape and size.

(5) Furthermore, the wettability of the top surface of the base member with respect to the droplet described in step (d) above can be adjusted before (b) above. As a result, it is possible to form an optical member having the desired shape and size. Here, for example, a film having either lyophilic or lyophobic properties with respect to the droplet is formed on the top surface of the base member, thereby controlling the wettability of the top surface of the base member with respect to the droplet.

(6) The optical member is a micro lens, and the optical component may be a micro lens substrate.

(7) Furthermore, the method of manufacturing an optical component may comprise (e) embedding the perimeter of the optical member using a sealing material. This enables the optical member to be secured to the top surface of the base member by using a simple and convenient method.

3. Optical Member Manufacturing Method

A method of manufacturing an optical component according to the present invention includes:

(a) forming a base member upon a substrate;

(b) ejecting a droplet on to the top surface of the base member to form an optical member precursor;

(c) curing the optical member precursor to form an optical member; and (d) removing the optical member from the top surface of the base member.

According to the method of manufacturing an optical member of the present invention, the optical member is used as a discrete optical component, and thus the optical member can be removed from the top surface of the base member by a simple and convenient method.

In this case, the base member in the step of (a) may be formed with a material that transmits light of a prescribed wavelength.

4. Micro Lens Substrate

A micro lens substrate of the present invention includes a base member formed on a substrate and a lens formed on the top surface of the base member.

According to the micro lens substrate of the present invention, it is possible to obtain a micro lens substrate containing a lens whose siting, shape and size are well controlled by controlling the shape, height and other characteristics of the top surface of the base member.

In this case, the base member may be composed of a material that transmits light of a prescribed wavelength.

5. Micro Lens Substrate Manufacturing Method

A method of manufacturing a micro lens substrate of the present invention includes:

(a) forming a base member upon a substrate;

(b) ejecting a droplet on to the top surface of the base member to form a lens precursor; and (c) curing the lens precursor to form a lens.

According to the method of manufacturing a micro lens substrate of the present invention, it is possible to form a micro lens substrate containing a lens whose siting, shape and size are well controlled by controlling the shape, height, siting and other characteristics of the top surface of the base member in the step of (a), and by controlling the volume of the ejected droplet in the step of (b).

Herein, the base member in the step of (a) may be formed with a material that transmits light of a prescribed wavelength.

6. Display Device

A display device of the present invention is equipped with the micro lens substrate of the present invention. Liquid crystal displays, liquid crystal projectors, and organic electro-luminescent displays can be cited as examples of such a display device.

7. Imaging Device

An imaging device of the present invention is equipped with the micro lens substrate of the present invention. A solid-state imaging element in a solid-state imaging device (such as a CCD) can be cited as an example of such an imaging device.

DETAILED DESCRIPTION OF PREFERRED EMBODIMENTS

An exemplary embodiment of the present invention is described with reference to the figures below.

1. Optical Component Structure

Figure 1:
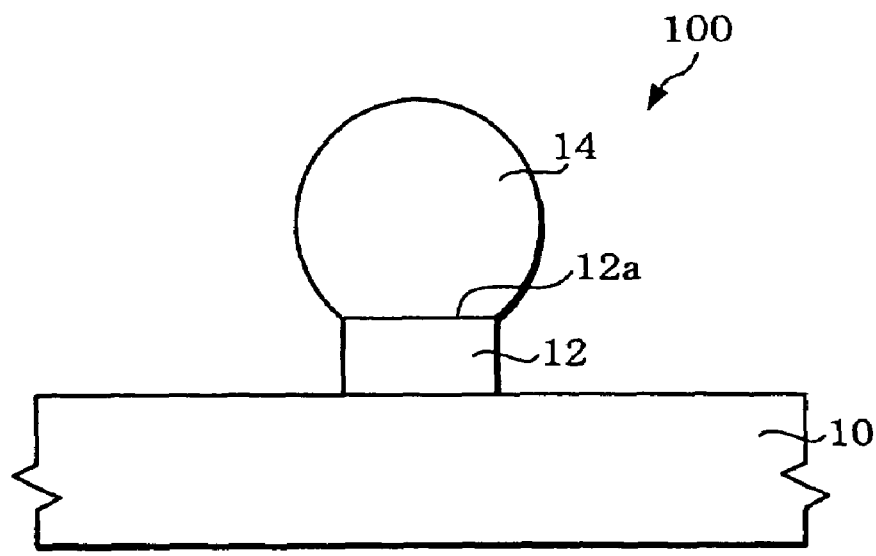
FIG. 1 is a sectional view that schematically shows an optical component of an exemplary embodiment applying the present invention.
Figure 2:
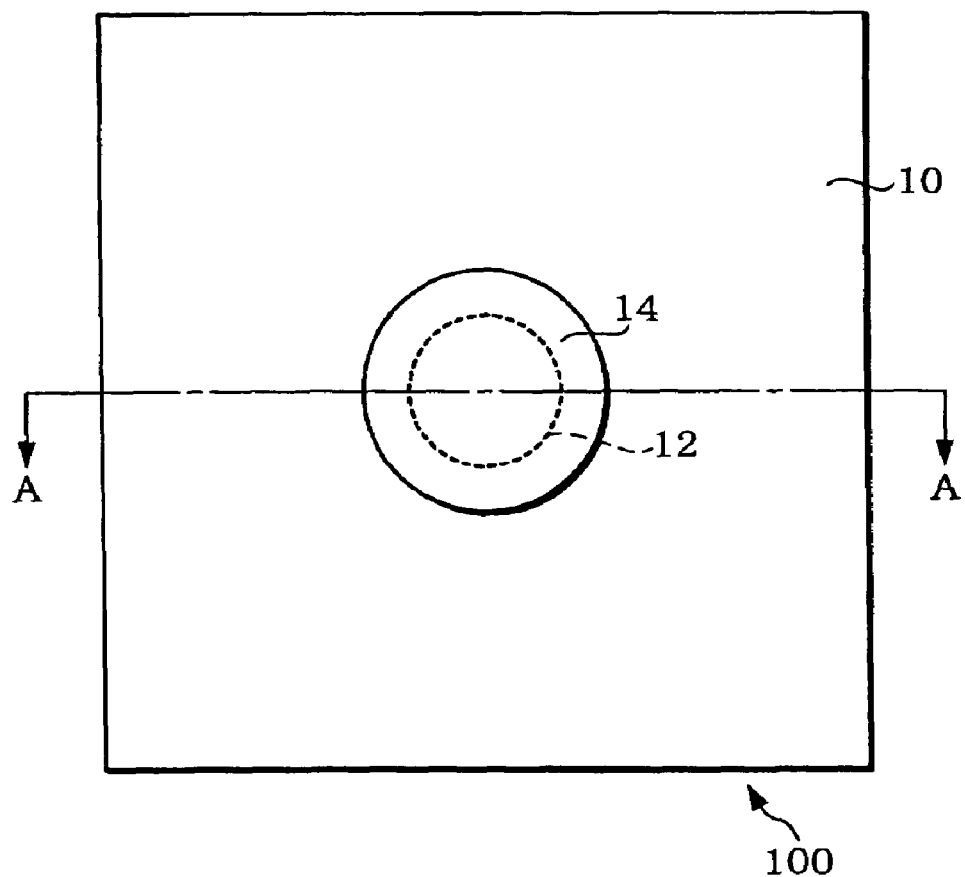
FIG. 2 is a plan view that schematically shows the optical component shown in FIG. 1.

FIG. 1 is a sectional view that schematically shows an exemplary embodiment of an optical component 100 applying the present invention. FIG. 2 is a plan view that schematically shows the optical component 100 shown in FIG. 1. Moreover, FIG. 1 is a cross-sectional view taken along plane A—A in FIG. 2.

Figure 3:
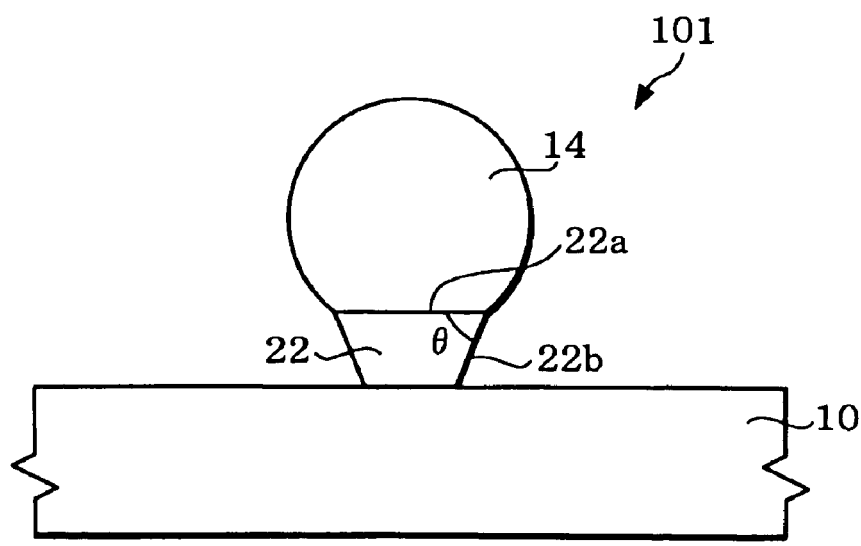
FIG. 3 is a sectional view that schematically shows an optical component of the exemplary embodiment applying the present invention.
Figure 4:
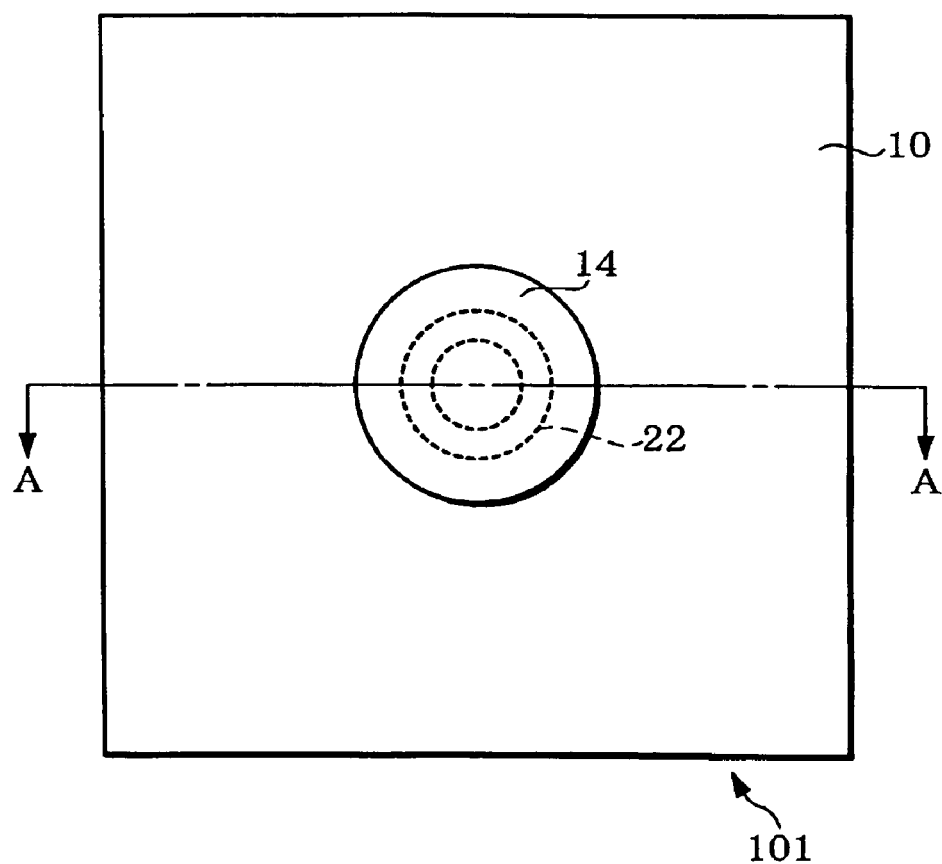
FIG. 4 is a plan view that schematically shows the optical component shown in FIG. 3.
Figure 5:
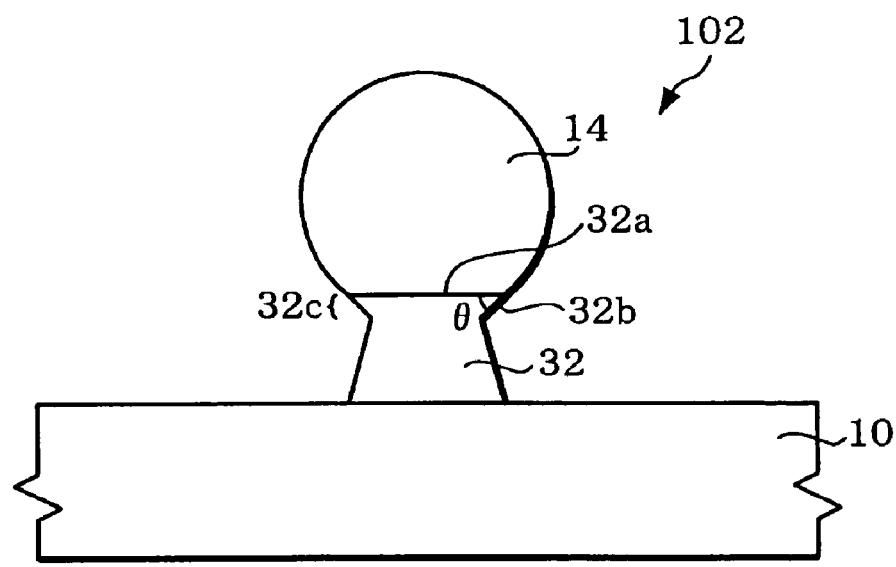
FIG. 5 is a sectional view that schematically shows an optical component of the exemplary embodiment applying the present invention.
Figure 6:
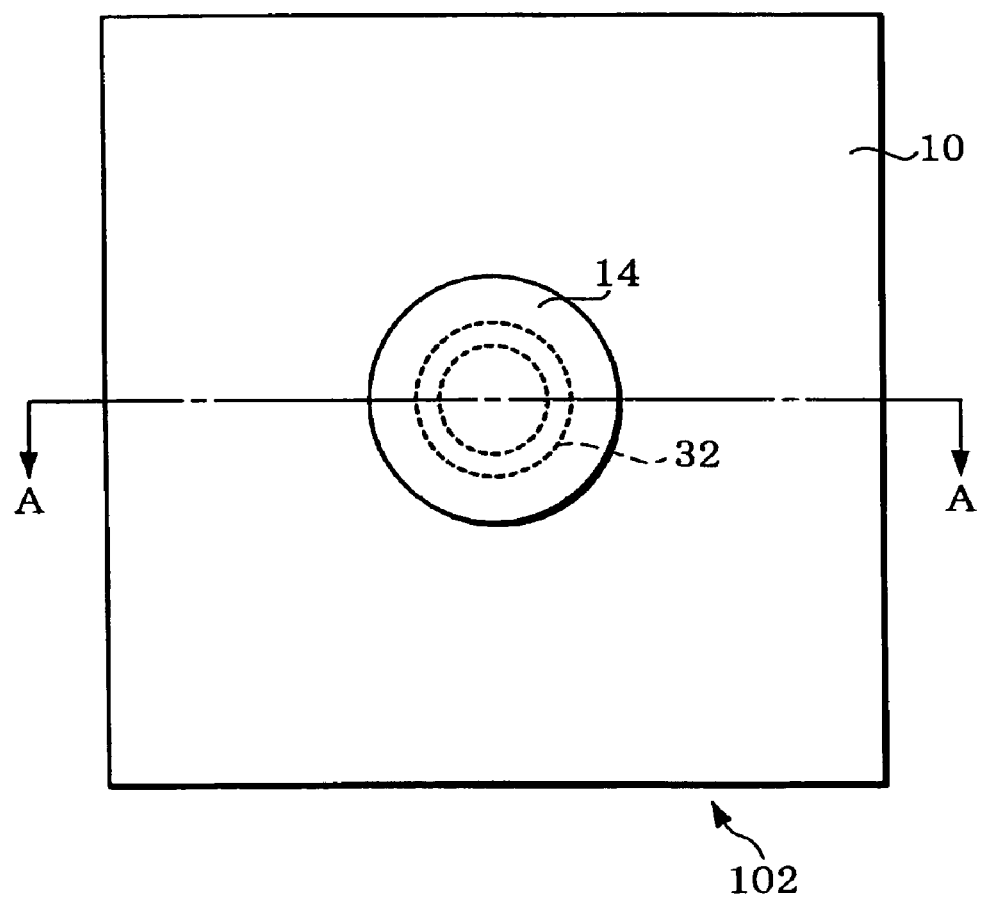
FIG. 6 is a plan view that schematically shows the optical component shown in FIG. 5.
Figure 7:
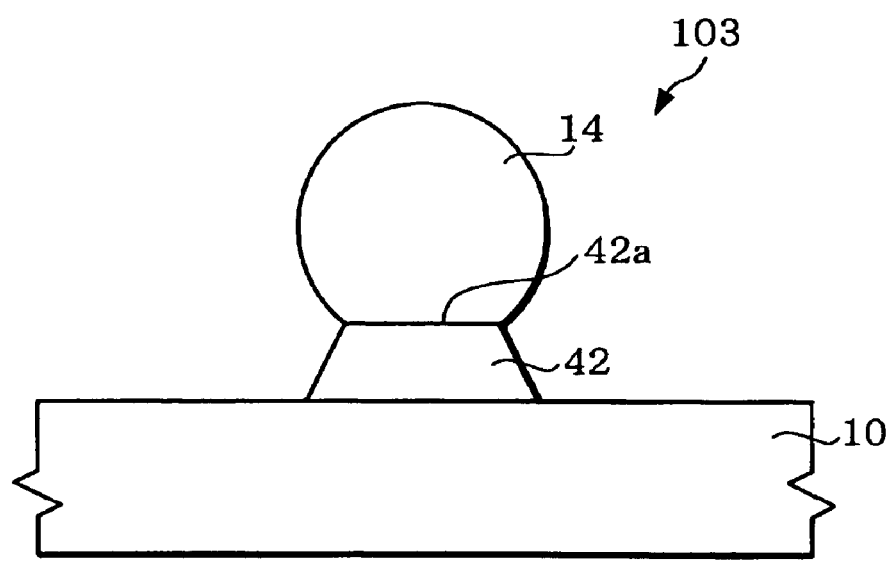
FIG. 7 is a sectional view that schematically shows an optical component of the exemplary embodiment applying the present invention.
Figure 8:
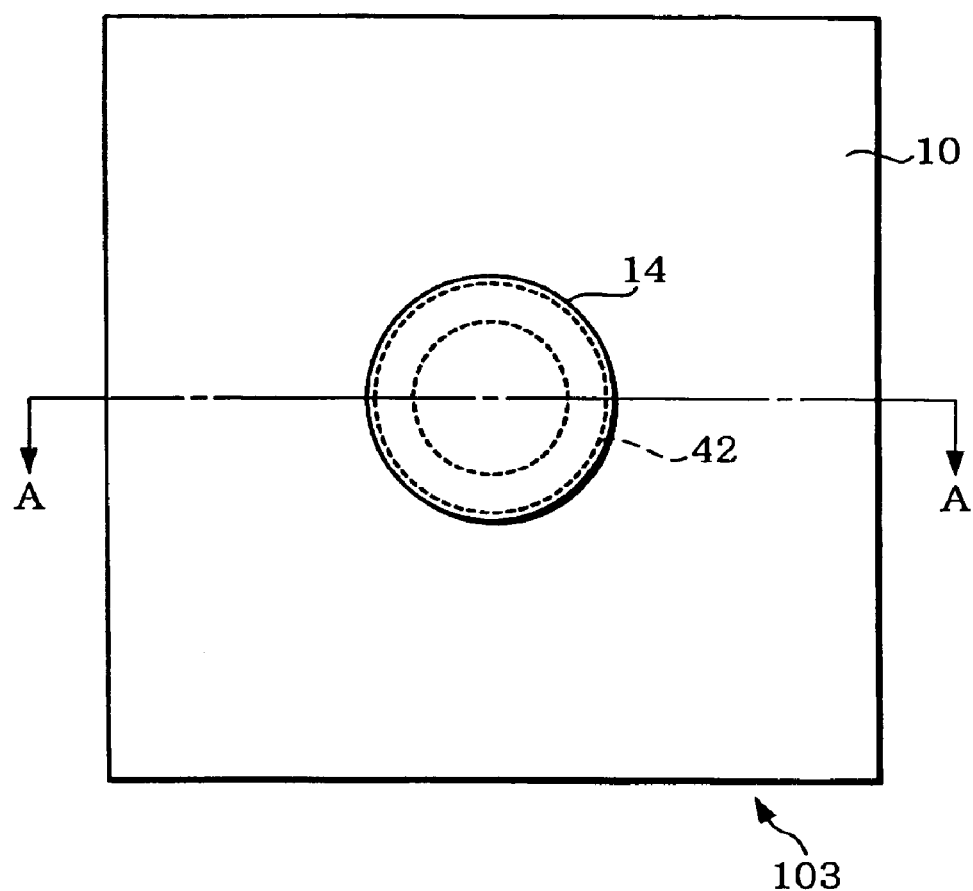
FIG. 8 is a plan view that schematically shows the optical component shown in FIG. 7.

FIG. 3, FIG. 5 and FIG. 7 are sectional views that schematically show an exemplary modification, where the shape of a base member 12 of the optical component 100 shown in FIG. 1 is changed. FIG. 4, FIG. 6, and FIG. 8 are plan views that schematically show optical components 101, 102, and 103 shown in FIG. 3, FIG. 5 and FIG. 7, respectively.

Figure 11:
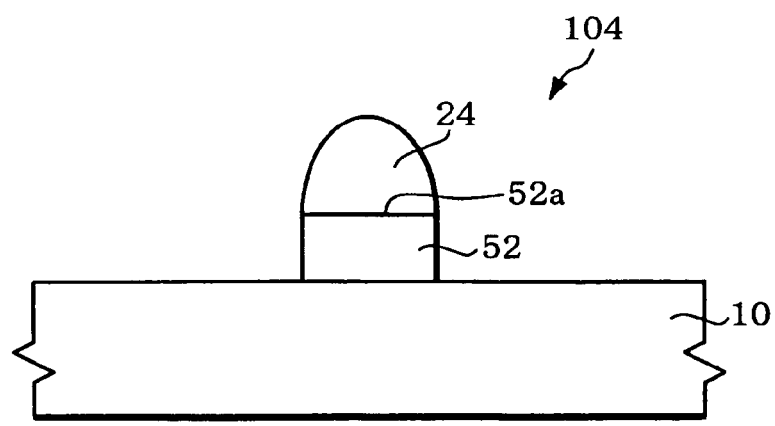
FIG. 11 is a sectional view that schematically shows an optical component of the exemplary embodiment applying the present invention.
Figure 12:
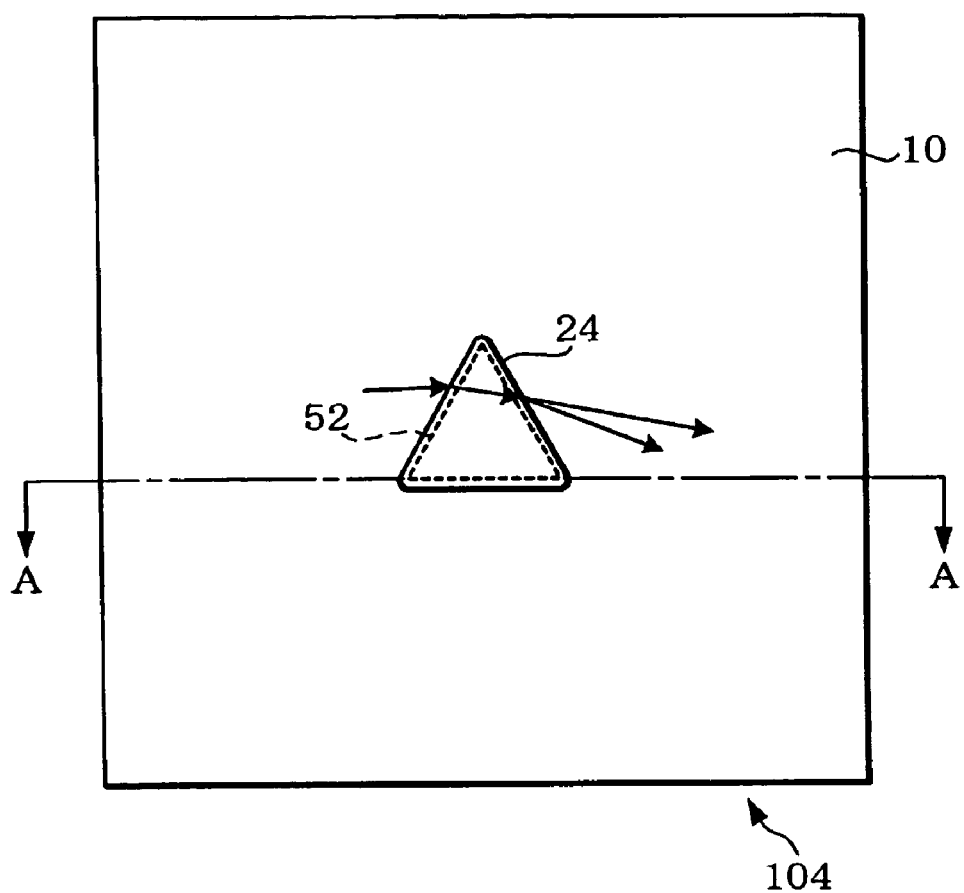
FIG. 12 is a plan view that schematically shows the optical component shown in FIG. 11.

In addition, FIG. 11 is a sectional view that schematically shows an exemplary modification, where the shape of the base member 12 and an optical member 14 of the optical component 100 shown in FIG. 1 is changed. FIG. 12 is a plan view that schematically shows the optical component 104 shown in FIG. 11.

Figure 27:
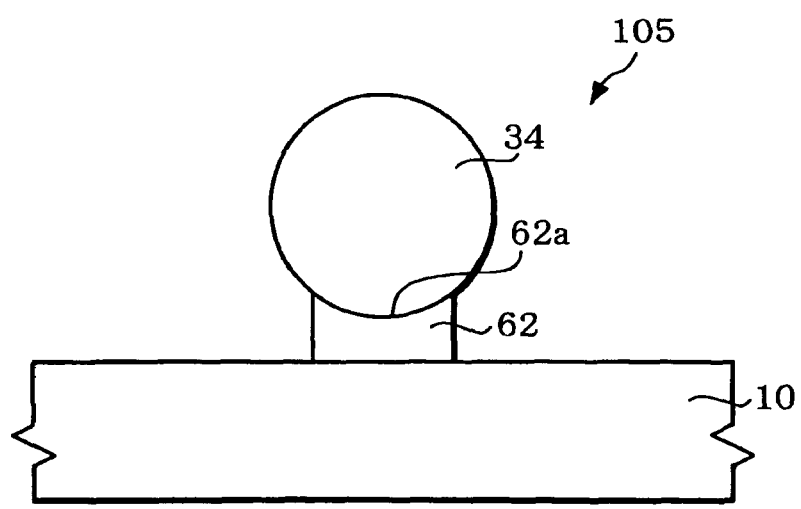
FIG. 27 is a sectional view that schematically shows an optical component of the exemplary embodiment applying the present invention.
Figure 28:
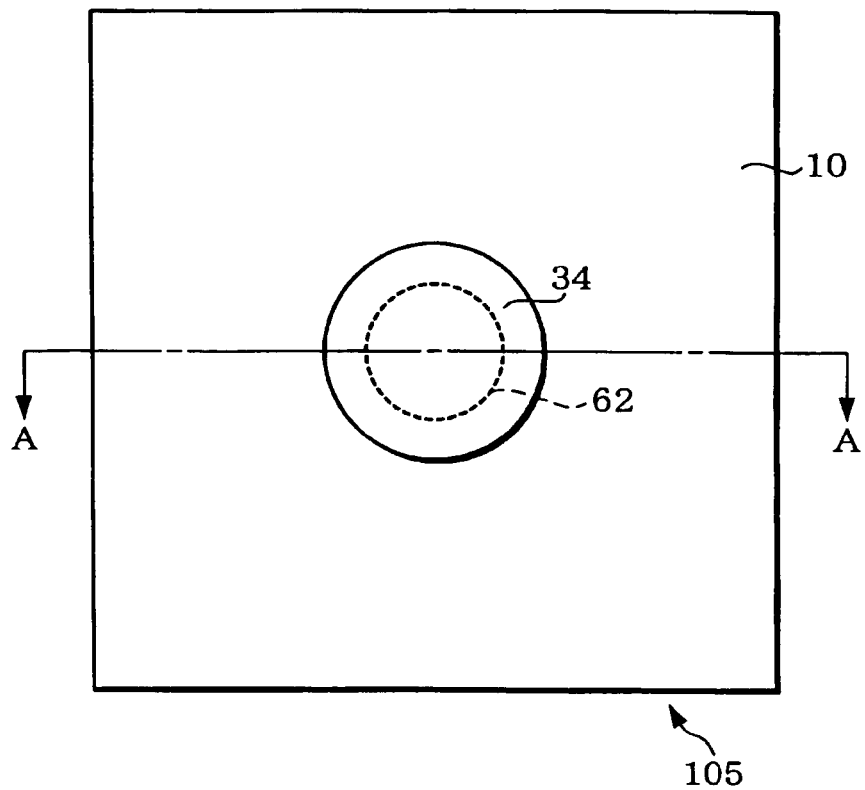
FIG. 28 is a plan view that schematically shows the optical component shown in FIG. 27.

In addition, FIG. 27 is a sectional view that schematically shows a modification example wherein the shape of the base member 12 and the optical member 14 of the optical component 100 shown in FIG. 1 is changed. FIG. 28 is a plan view that schematically shows an optical component 105 shown in FIG. 27.

The optical component 100 of this exemplary embodiment includes the base member 12 disposed on a substrate 10, and an optical member disposed on a top surface 12a of the base member 12. The optical member 14 may have, for example, one or more of a function to condense, polarize or separate rays of incident light. The constituent elements of the optical component of the exemplary embodiment are explained below, with reference primarily to FIG. 1 and FIG. 2.

[Substrate]

The substrate 10 may be, for example, a semiconductor substrate, such as a silicon substrate or a GaAs substrate, or a glass substrate.

[Base Member]

(A) Material

In the optical component 100 of the exemplary embodiment, the base member 12 includes a material that transmits light of a prescribed wavelength. Specifically, the base member 12 includes a material that can transmit incident light to the optical member 14. For example, the base member 12 may be formed using a polyimide resin, an acrylic resin, an epoxy resin or a fluorinated resin. The present exemplary embodiment cites an instance in which the base member 12 includes a material that transmits light of a prescribed wavelength, but the base member 12 may also be formed from a material that absorbs light of a prescribed wavelength.

Moreover, the base member 12 may also be formed so that it is integrated with the substrate 10. In other words, the base member 12 in this case is formed from the same material as the substrate 10.

This type of the base member 12 can be formed, for example, by patterning the substrate 10.

(B) Three-Dimensional Shape

Exemplary modifications (the optical components 101, 102, 103) in which the three-dimensional shape of the base member 12 shown in FIG. 1 and FIG. 2 was changed are shown in FIG. 3 through FIG. 8. As shown in FIG. 1 through FIG. 8, the three-dimensional shape of the base member is not particularly prescribed, but at a minimum the structure must be such that an optical member can be disposed thereupon. For example, as shown in FIG. 1, the base member 12 of the optical component 100 is such that the top surface 12a can support the disposition of the optical member 14 thereupon.

Also, as shown in FIG. 3 and FIG. 4, the angle θ formed between a top surface 22a and a side surface 22b of a base member 22 can be made an acute angle. Here, the side surface 22b of the base member 22 refers to the surface within the side member of the base member 22 that is adjacent to the top surface 22a. In FIG. 3 and FIG. 4, the side member of base member 22 is the side surface 22b of the base member 22.

The optical member 14 is formed by first ejecting a droplet on to the top surface 22a of the base member 22 so as to form an optical member precursor (to be explained later), and by then curing the optical member precursor. Therefore, the acute angle θ formed between the top surface 22a and the side surface 22b of the base member 22 prevents the side surface 22b of the base member 22 from becoming wet by a droplet when a droplet is ejected to the top surface 22a of the base member 22. As a result, it is possible to reliably form an optical member 14 having the desired shape and size. For example, as shown in FIGS. 3 and 4, the cross-section of optical member 14 is formed greater than the cross-section of base member 22.

In addition, as shown in FIG. 5 and FIG. 6, the three-dimensional shape of the base member 32 can be formed such that the upper part 32c of the base member 32 forms an inverse tapered shape. In this case, too, an acute angle θ is formed between a top surface 32a of a base member 32 and the side surface 32b of it (the surface within the side member of the base member 32 that is adjacent to the top surface 32a). According to this configuration, the angle θ formed between the top surface 32a and side surface 32a of the base member 32 can be made smaller while maintaining the stability of the base member 32. In this way, the side surface 32b of the base member 32 can be reliably prevented from becoming wet by the droplet. As a result, it is possible to more reliably form the optical member 14 having the desired shape and size.

(C) Shape of the Top Surface

The shape of the top surface of the base member is determined by such considerations as the function and application of the optical member formed on the top surface of the base member. In other words, the shape of the optical member can be controlled by controlling the shape of the top surface of the base member.

For example, in the optical component 100 shown in FIG. 1 and FIG. 2, the top surface 12a of the base member 12 is round. Moreover, in the optical components 101, 102 and 103 shown in FIG. 3 to FIG. 8, the top surface of the base member is also depicted as being round.

Figure 9:
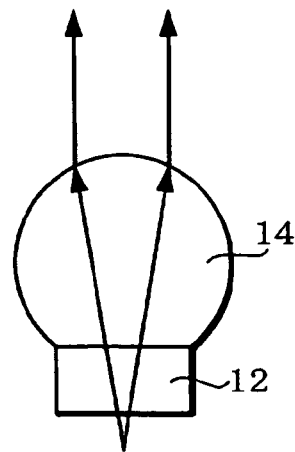
FIG. 9 is a sectional view that schematically shows a case where the optical member shown in FIG. 1 and FIG. 2 functions as a lens.
Figure 10:
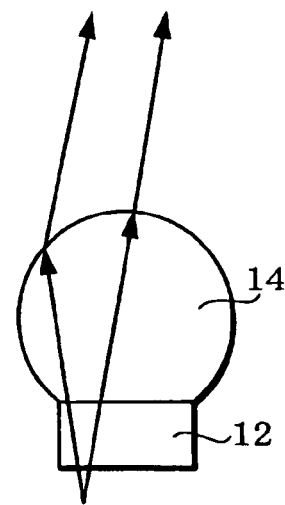
FIG. 10 is a sectional view that schematically shows a case where the optical member shown in FIG. 1 and FIG. 2 functions as a polarizing element.

If the optical member is to be used as a lens or a polarizing element, for example, then the top surface of the base member is made round. This enables the optical member to be formed in a three-dimensional spherical shape or in a sectioned spherical shape, and the optical member thus obtained can be used as a lens or as a polarizing element. An example in which the optical member 14 of the optical component 100 shown in FIG. 1 and FIG. 2 is applied as a lens is shown in FIG. 9. In other words, as shown in FIG. 9, light rays can be gathered and condensed by the optical member (lens) 14. In addition, an example in which the optical member 14 of the optical component 100 shown in FIG. 1 and FIG. 2 is applied as a polarizing element is shown in FIG. 10. In other words, as shown in FIG. 10, the travel direction of the light can be changed by the optical member (polarizing element) 14.

Also, although not shown in a drawing, if the optical member is used as an anisotropic lens or as a polarizing element, for example, then the top surface of the base member is made elliptical. This enables the optical member to be formed in a three-dimensional elliptical spherical shape or in a sectioned elliptical spherical shape, and the optical member thus obtained can be used as an anisotropic lens or as a polarizing element.

Alternatively, if the optical member is to be used as a light-splitter (prism), for example, then the top surface of the base member may be made triangular. This optical member, whose base member has a triangular shape, is formed by ejecting a droplet on to the top surface of the base member so as to form an optical member precursor, and by then curing the optical member precursor. The optical member thus formed can be used as a light-splitting element. The details of the manufacturing method are explained below. An example in which the optical member is to be used as a prism is shown in FIG. 11 and FIG. 12. FIG. 11 is a cross-sectional view taken along plane A—A in FIG. 12. As shown in FIG. 11 and FIG. 12, a base member 52 is triangular. Therefore, the shape of a top surface 52a of the base member 52 is triangular. The optical member 24 functions as a light-splitter (prism). Specifically, as shown in FIG. 12, the light incident on an optical member 24 is split upon exit.

Moreover, in all the aforementioned base members 12, 22, 32, 42, 52, the top surface is depicted as planar. However, as shown in FIG. 27 and FIG. 28, a top surface 62a of a base member 62 may also be a curved surface. In the optical component 105 shown in FIG. 27 and FIG. 28, an essentially spherical optical member 34 may be disposed on the top surface 62a of the base member 62.

[Optical Member]

(A) Three-Dimensional Shape

The optical member has a three-dimensional shape that depends on the optical member's application and function. Details regarding the three-dimensional shape of the optical member will be omitted here, as they were provided in conjunction with the explanation regarding the base member.

(B) Material

The optical member 14 is formed, for example, by curing a liquid material that can be cured by applying heat or light or some other form of energy. Specifically, the optical member 14 in the present exemplary embodiment is formed by first ejecting a droplet consisting of the aforementioned liquid material to the top surface 12a of the base member 12 so as to form an optical member precursor (to be explained below), and by then curing the optical member precursor.

A precursor of an ultraviolet curing resin or of a thermosetting resin, for example, can be cited as the aforementioned liquid material. An ultraviolet curing resin and epoxy resin can be cited as examples of an ultraviolet curing resin. Moreover, a thermosetting polyimide resin can be exemplified as a thermosetting resin.

2. A Method of Manufacturing an Optical Component

Figure 13:
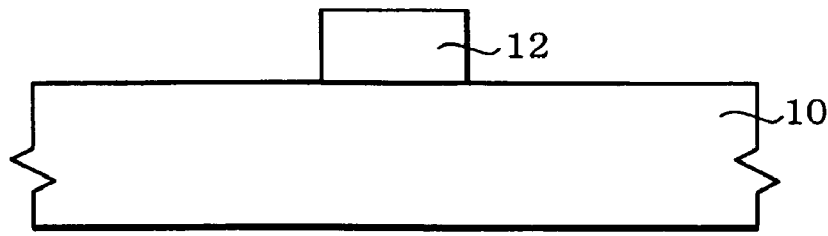
FIG. 13(a)–FIG. 13(c) are sectional views that schematically show a process of manufacturing the optical component shown in FIG. 1 and FIG. 2, respectively.
Figure 13:
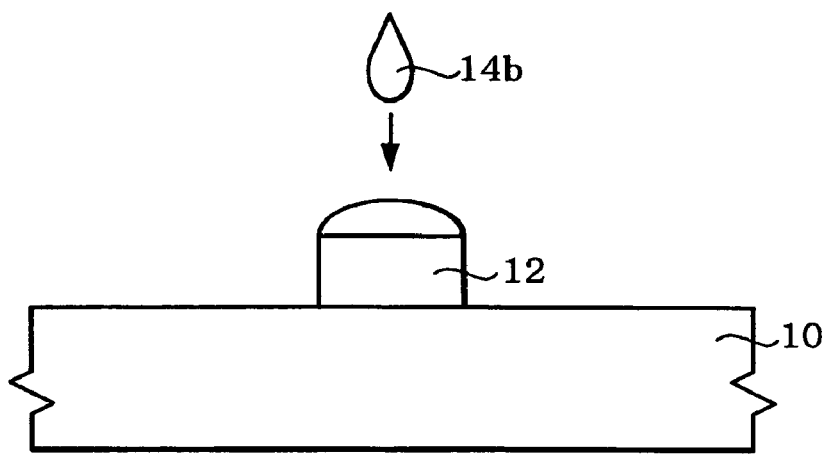
Figure 13:
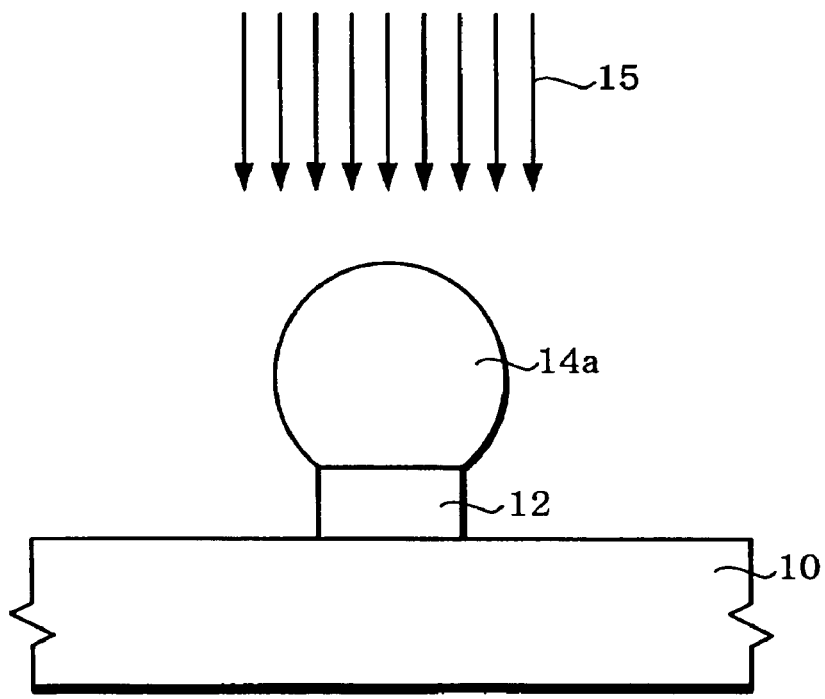

Next, a method of manufacturing the optical component 100 shown in FIG. 1 and FIG. 2 is explained with reference to FIG. 13(a) to FIG. 13(c). FIG. 13(a) to FIG. 13(c) are sectional views that schematically show the process for manufacturing the optical component 100 shown in FIG. 1 and FIG. 2, respectively.

First, the base member 12 is formed on the substrate 10 [FIG. 13(a).] The base member 12 can be formed by selecting a suitable method (for example, a selective growth method, a dry etching method, a wet etching method, a lift-off method, a transfer method, etc.) according to the material, shape, and size of the base member 12.

Next, the optical member 14 is formed [FIG. 13(b)]. Specifically, a droplet 14b of a liquid material of forming the optical member 14 is ejected on to the top surface 12a of the base member 12 so as to form an optical member precursor 14a. As described above, the liquid material is such that it can be cured by the application of energy 15.

A dispenser method or an inkjet method, for example, can be cited as methods for ejecting the droplet 14b. A dispenser method is commonly used to eject droplets and is effective when ejecting the droplet 14b over a relatively large area. In an ink-jet method, droplets are ejected using an inkjet head, with micron-order control possible over the location in which droplets are ejected. In addition, since the volume of an ejected droplet can be controlled on a picoliter order, an optical member of a minute structure can be produced.

Moreover, before the droplet 14b is ejected, a lyophilic process or a lyophobic process is performed so that the wettability of the top surface 12a with respect to the droplet 14b can be controlled. As a result, it is possible to form the optical member 14 having the prescribed shape and size.

Next, the optical member precursor 14a is cured so as to form the optical member 14 [FIG. 13(c)]. Specifically, heat or light or some other form of energy is applied to the optical member precursor 14a. A suitable method of curing the optical member precursor 14a is used according to the type of liquid material used. Specifically, the application of thermal energy, or the irradiation with ultraviolet light or laser light can be cited as examples of curing methods. The aforesaid process is used to obtain the optical component 100 that includes an optical member (FIG. 1 and FIG. 2).

Figure 14:
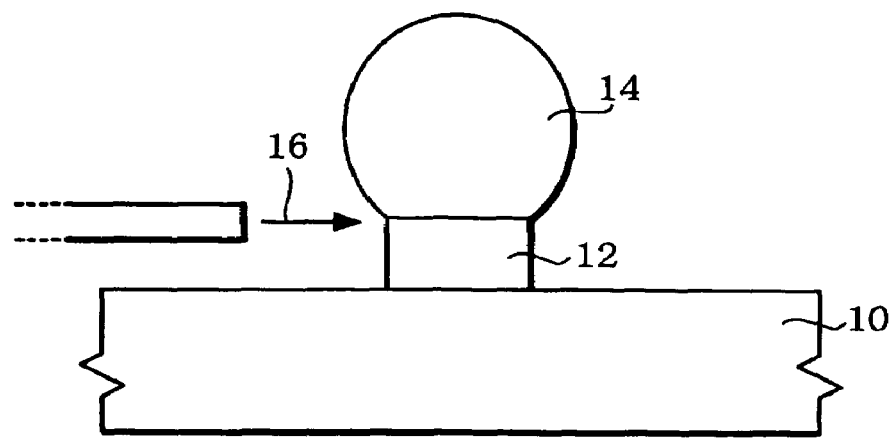
FIG. 14 is a sectional view that schematically shows a method of removing an optical member of the exemplary embodiment applying the present invention.

Furthermore, the optical member 14 can also be removed from the optical component 100 that is formed and can be used as a discrete optical component. For example, as shown in FIG. 14, the optical member 14 can be removed by spraying a gas 16 (an inert gas such as argon gas or nitrogen gas, for example) on the interface between the base member 12 and the optical member 14. Or, the optical member 14 can be removed from the top surface 12a of the base member 12 by affixing adhesive tape (not shown) to the top of the optical member 14 and then pulling off the tape.

3. Effect

The optical component and the method of manufacturing the optical component of the present exemplary embodiment has the effect shown below.

(1) First, the size and shape of the optical member 14 can be strictly controlled. That is, the shape of the optical member 14 can be controlled by the volume of the ejected droplet 14b. As a result, it is possible to obtain an optical component that includes the optical member 14 having the desired shape and size.

Figure 29:
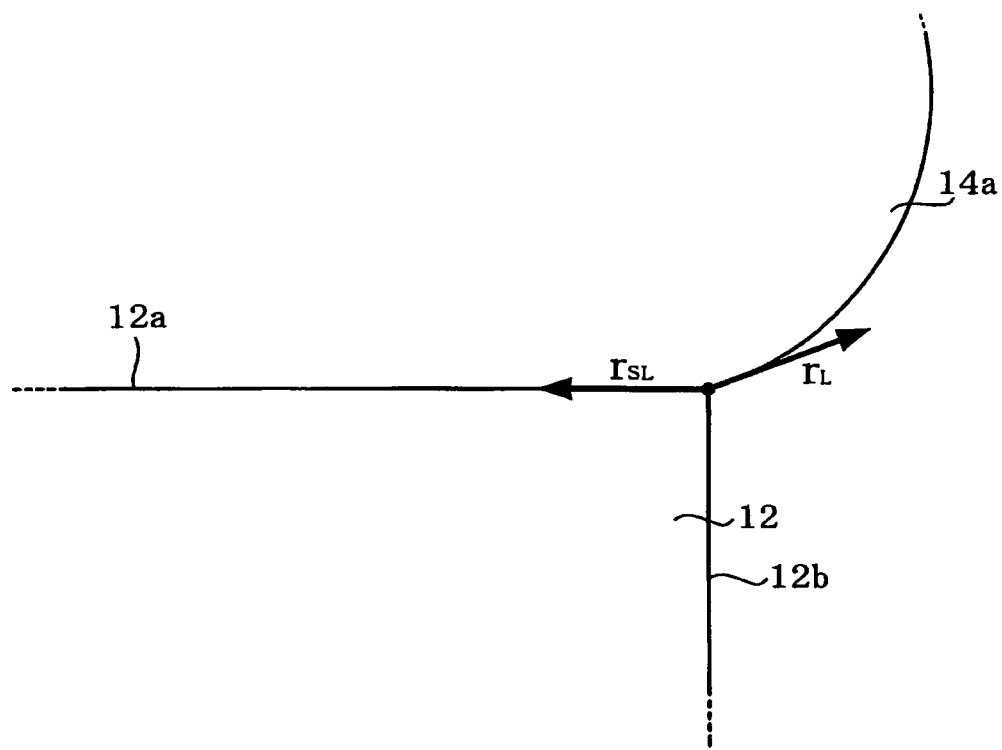
FIG. 29 is an enlarged view of a cross-section of FIG. 13(c)
Figure 30:
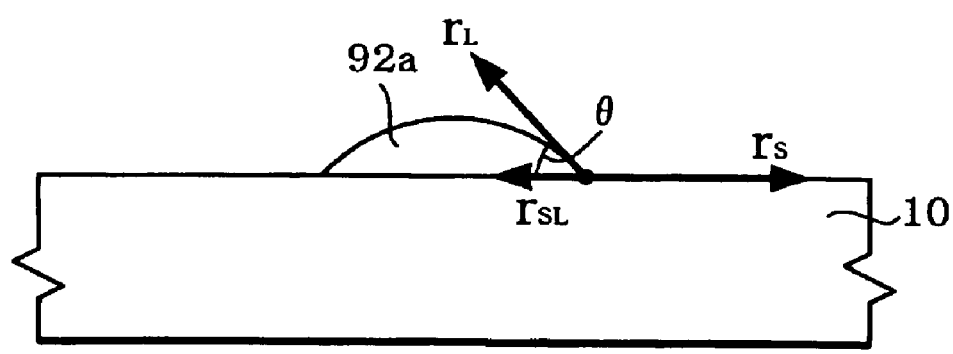
FIG. 30 is a sectional view that schematically shows the method of manufacturing a commonly used optical component.

The aforesaid effects are discussed in detail below with reference to drawings. FIG. 29 is a sectional view that schematically shows the area around the interface between the base member 12 and the optical member precursor 14c, in the manufacturing process [FIG. 13(a) to FIG. 13(c)] for the optical component 100 of the present exemplary embodiment described above. Specifically, FIG. 29 is an enlarged view of the cross-section in FIG. 13(c). FIG. 30 is a sectional view that schematically shows the method of manufacturing a commonly used optical component.

First, before covering in detail the effect of the present exemplary embodiment, the method of manufacturing a commonly used optical member is described with reference to FIG. 30.

(a) Method of Manufacturing a Commonly Used Optical Component

One related art method of manufacturing an optical member involves first ejecting a liquid material onto the substrate 10 to form an optical member precursor, and then curing the optical member precursor to obtain an optical member.

FIG. 30 is a sectional view showing a liquid material to form the optical member after the liquid material has been ejected onto the substrate 10. Specifically, FIG. 30 shows the state before the optical member precursor is cured; that is, the state in which the optical member precursor 92a, which is composed of the liquid material, is situated on top of the substrate 10.

In FIG. 30, Formula (1) below holds true for the relationship among $\lambda_S$, $\lambda_L$ and $\lambda_{SL}$, where $\lambda_S$ is defined as the surface tension of the substrate 10, $\lambda_L$ is the surface tension of the liquid material (optical member precursor), $\lambda_{SL}$ is the interface tension between the substrate 10 and the liquid material, and θ is the contact angle of the liquid material against the substrate 10.

$$\lambda_S = \lambda_{SL} + \lambda_L \cos\theta \qquad \text{Formula (1)}$$

The curvature of an optical member precursor 92a made up of the liquid material is limited by the contact angle θ determined by Formula (1). In other words, the curvature of the optical member obtained after the optical member precursor 92a has been cured is primarily dependent on the material of the substrate 10 and of the liquid material. The curvature of the optical member is one factor that determines the shape of the optical member. Consequently, it is difficult to control the shape of the optical member that is formed using this manufacturing method.

In addition, in this instance, although not shown in a related art method, a film to adjust the wetting angle is first formed in a prescribed location on the surface of the substrate 10, after which a droplet of a liquid material is ejected, thereby increasing the contact angle θ of the liquid material. According to this method, the shape of the optical member can be controlled to some extent. However, there are limits to controlling the shape of an optical member by forming a film for adjusting the wetting angle.

(b) Method of Manufacturing an Optical Component of the Present Exemplary Embodiment In contrast to the aforesaid method, according to the method of manufacturing an optical component of the present exemplary embodiment, the optical member precursor 14a is formed on the top surface 12a of the base member 12, as shown in FIG. 29. Accordingly, as long as the side surface 12b of the base member 12 is not wetted by the optical member precursor 14a, the surface tension of the base member 12 does not affect the optical member precursor 14a. Instead, it is the surface tension $\lambda_L$ of the optical member precursor 14a that has the primary effect. For this reason, the shape of the optical member precursor 14a can be controlled by adjusting the volume of the droplet used to form the optical member precursor 14a. As a result, it is possible to obtain the optical member 14 having the desired shape and size.

(2) Second, the siting of the optical member 14 can be strictly controlled. As stated above, the optical member 14 is formed by first ejecting the droplet 14b on to the top surface 12a of the base member 12 so as to form the optical member precursor 14a, and by then curing the optical member precursor 14a [FIG. 13(b)]. In general, it is difficult to strictly control the location at which an ejected droplet lands. Nevertheless, according to this method, the optical member 14 can be formed on the top surface 12a of the base member 12 without a special alignment step. That is, the optical member precursor 14a can be formed without an alignment step, by simply ejecting the droplet 14b onto the top surface 12a of the base member 12. In other words, the optical member 14 can be formed at the same alignment accuracy as that when the base member 12 was formed. Accordingly, an optical member 14 whose siting has been controlled can easily be achieved.

(3) Third, the shape of the optical member 14 can be established by establishing the shape of the top surface 12a of the base member 12. That is, by selecting the appropriate shape for the top surface 12a of the base member 12, it is possible to form the optical member 14 having the prescribed function. Therefore, by changing the shape of the top surface 12a of the base member 12, it is possible to place a plurality of optical members having different functions on the same substrate.

(4) Fourth, the distance between the substrate 10 and the optical member 14 can be controlled by controlling the height of the base member 12. This facilitates the alignment between the substrate 10 and the optical member 14. It also enables the optical member 14 whose siting is controlled to be formed by a simple and convenient method.

The present invention is not limited to the exemplary embodiment described above and may have a large variety of variations. For example, the present invention includes the configuration described in the exemplary embodiment, as well as configurations that are essentially the same thereto (for example, configurations whose functions, methods and results are the same, or configurations whose purpose and result are the same thereto). In addition, the present invention includes configurations in which parts nonintrinsic to the configuration described in the exemplary embodiment are substituted. In addition, the present invention includes configurations that achieve the same effect as the configuration described in the exemplary embodiment, as well as configurations that can achieve the same purpose thereof. In addition, the present invention includes configurations in which related art technology or technology known in the art is added to the configuration described in the exemplary embodiment.

EXAMPLES

Next, examples wherein the aforementioned exemplary embodiment is applied are described. Each of Examples 1–3 provides an example wherein the optical component 100 of the present exemplary embodiment is applied to a micro lens substrate. The micro lens substrate is disposed, for example, in a pixel member of a liquid crystal display panel, in a receiver surface of a solid-state imaging device (CCD), or in an optical coupling member of an optical fiber. Moreover, Example 4 describes a method of removing the optical member 14 obtained in Example 1.

Example 1

1. Micro Lens Substrate Structure

Figure 15:
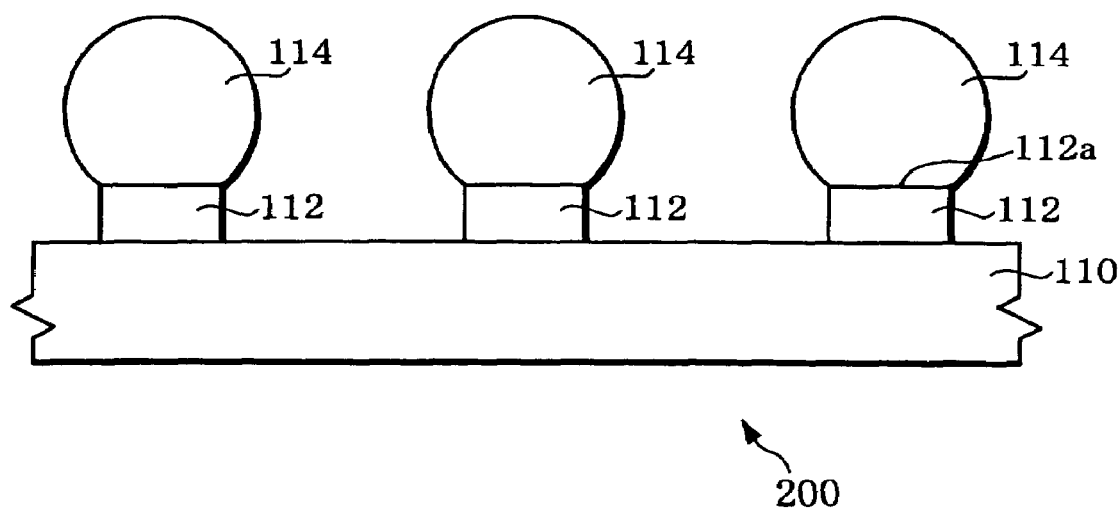
FIG. 15 is a sectional view that schematically shows the micro lens substrate of one example of the present exemplary embodiment.
Figure 16:
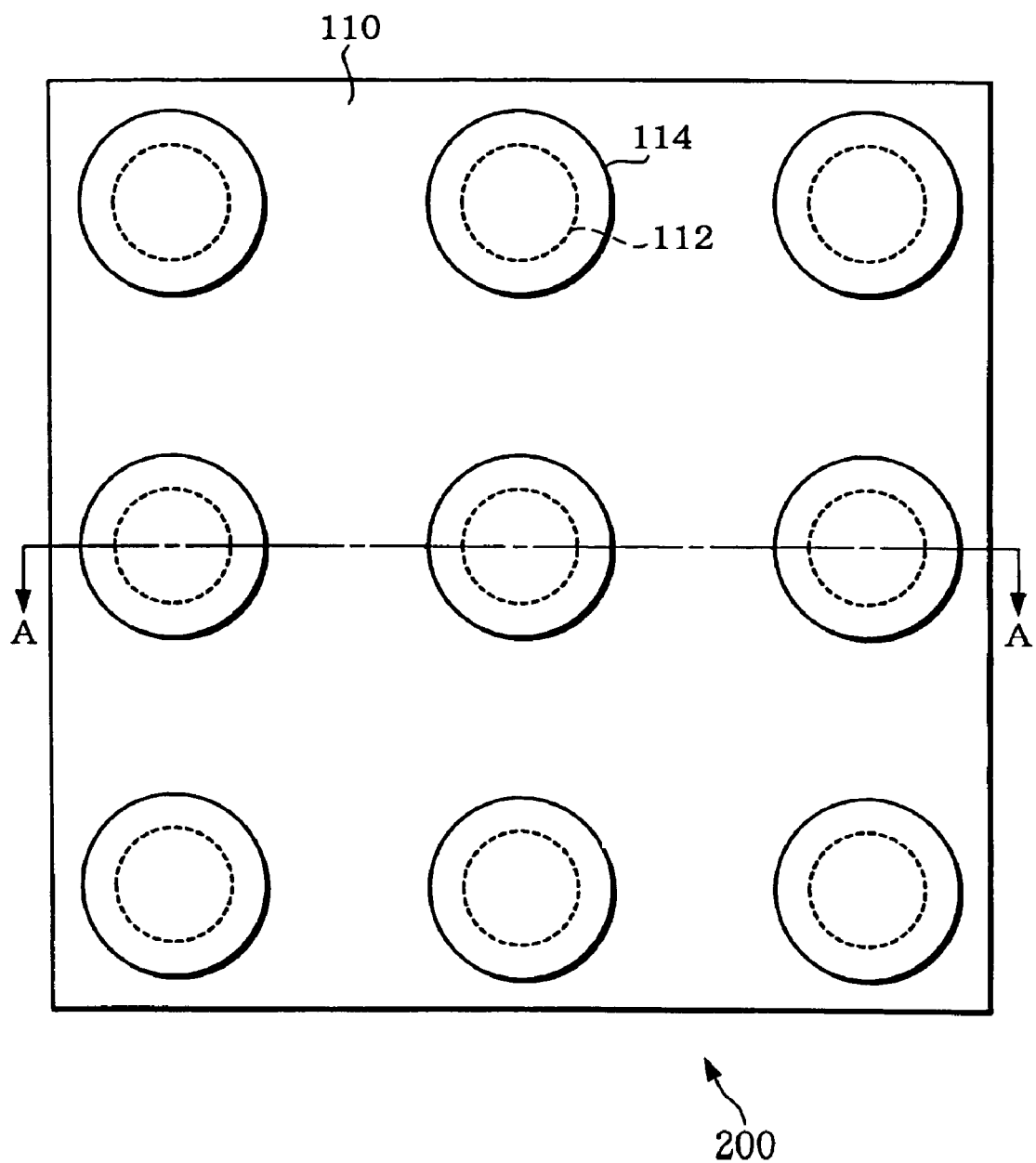
FIG. 16 is a plan view that schematically shows the micro lens substrate shown in FIG. 15.

FIG. 15 is a sectional view that schematically shows a micro lens substrate 200 of Example 1. FIG. 16 is a plan view that schematically shows the micro lens substrate 200 shown in FIG. 15. Moreover, FIG. 15 schematically shows a cross-section along plane A—A in FIG. 16.

As shown in FIG. 15, the micro lens substrate 200 has a plurality of optical members 114 disposed thereupon. The optical members 114 are disposed on a top surface 112a of a base member 112. The base members 112 are formed upon a substrate 110.

In the present example, the substrate 110 is a glass substrate, the base members 112 are a polyimide resin, and the optical members 114 include an ultraviolet cured resin.

Figure 26:
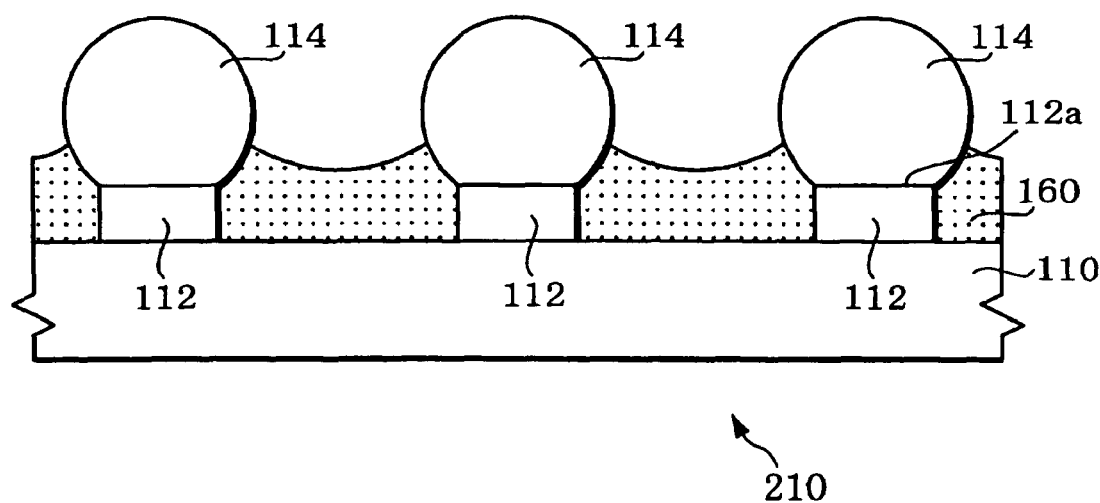
FIG. 26 is a sectional view that schematically shows one exemplary modification of the micro lens substrate shown in FIG. 15.

In addition, to secure the optical members 114, where necessary, the perimeter of the optical members 114 may be embedded using a sealing material 160 (FIG. 26). Likewise, the perimeter of the optical members 114 in Examples 2 and 3 below may also, where necessary, be embedded using a sealing material 160. The sealing material 160 preferably includes a material having a smaller refractive index than the material that comprises the optical members 114. The material of the sealing material 160 is not specifically prescribed, but a resin, for example, may be used.

2. A Method of Manufacturing a Micro Lens Substrate

Figure 17:
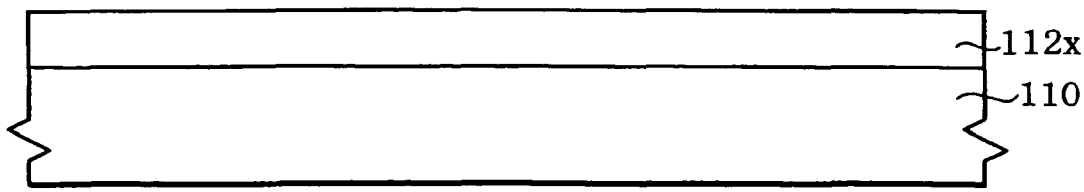
FIG. 17(a)–FIG. 17(e) are sectional views that schematically show the process of manufacturing the optical component shown in FIG. 15 and FIG. 16, respectively.
Figure 17:
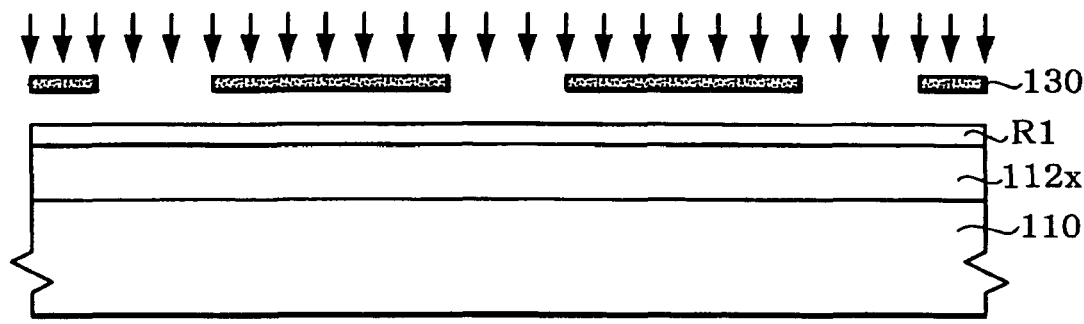
Figure 17:
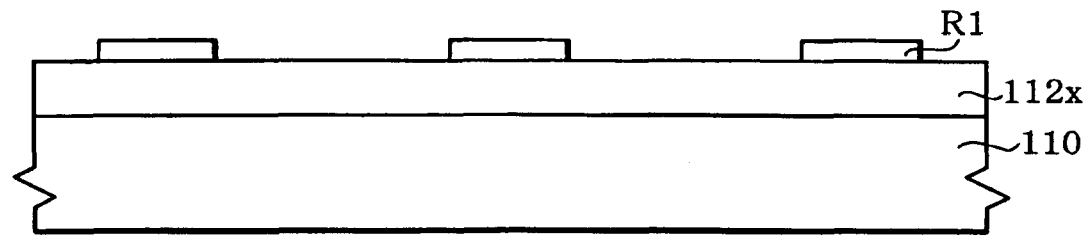
Figure 17:
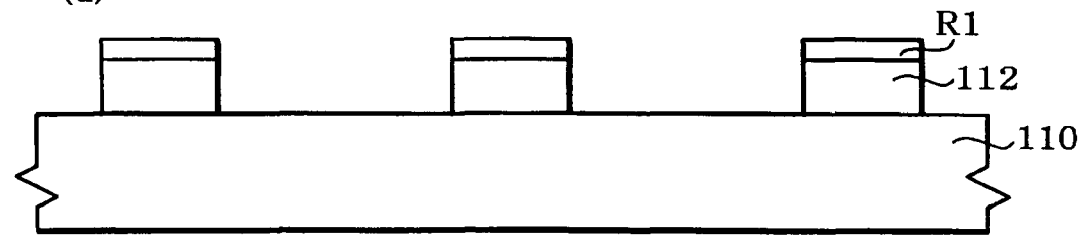
Figure 17:
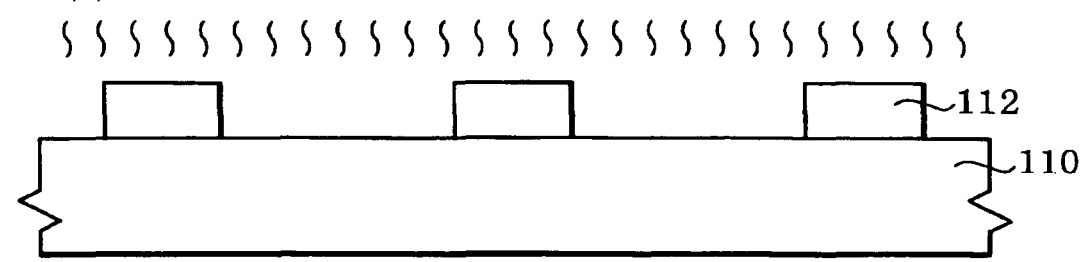
Figure 18:
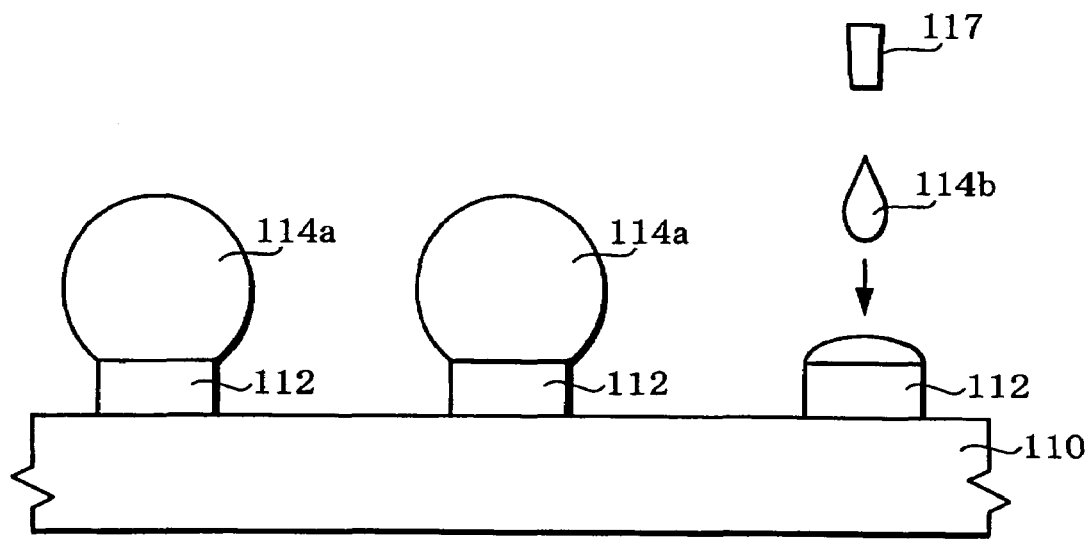
FIG. 18(a) and FIG. 18(b) are sectional views that schematically show the process of manufacturing the micro lens substrate shown in FIG. 15 and FIG. 16, respectively.
Figure 18:
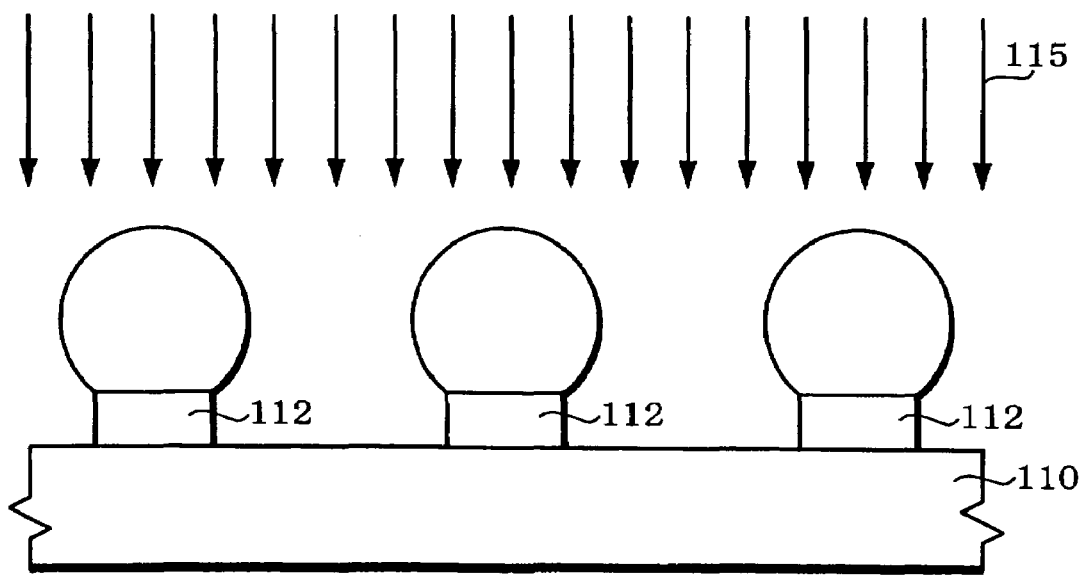

Next, a method of manufacturing the micro lens substrate 200 of the present example is described. FIG. 17(a) to–FIG. 17(e), as well as FIG. 18(a) and FIG. 18(b), are sectional views that schematically show the process for manufacturing the micro lens substrate 200 shown in FIG. 15 and FIG. 16, respectively.

First, after a polyimide precursor is applied to the substrate 110, which consists of a glass substrate, the substrate 110 is heat treated at approximately 150° C. [FIG. 17(a)]. A resin layer 112x is thereby formed. Although it can maintain its shape at this point in time, the resin layer 112x is not completely cured.

Next, after a resist layer R1 is formed on the resin layer 112x, a photolithography step is performed using a mask 130 having a prescribed pattern [FIG. 17(b)]. A resist layer R1 of the prescribed pattern is thereby formed [FIG. 17(c)].

Then, with the resist layer R1 as a mask, the resin layer 112x is patterned by, for example, wet etching using an alkaline solution. The base members 112 are thereby formed [FIG. 17(d)]. Next, the resist layer R1 is stripped, after which heat treatment at approximately 350° C. is performed, thereby completely curing the base members 112 [FIG. 17(e)].

Then, using an inkjet head 117, a droplet 114b of a liquid material to form the optical member 114 is ejected onto the top surface 112a of the base member 112 so as to form the optical member precursor (lens precursor) 114a. This optical member precursor 114a is converted to an optical member 114 (FIG. 15 and FIG. 16) by a subsequent curing process. In addition, in the present example, an instance is described where a precursor of an ultraviolet cured resin is used as the liquid material, and an inkjet method is used as the method of ejecting the droplets 114b. Where necessary, the optical member precursor 114a of the desired shape and size is formed on the top surface 112a of the base member 112 by ejecting a plurality of droplets 114b. The droplets 114b is ejected until a cross-section of the optical member 114 become greater than a cross-section of the top surface 112a.

Next, the optical member 114 is formed by irradiating the optical member precursor 114a with ultraviolet rays 115 [FIG. 18(b)]. The amount of ultraviolet irradiation is suitably adjusted according to the shape, size, and material of the optical member precursor 114a. The optical members (lenses) 114 are formed by the aforesaid process. The micro lens substrate 200 that includes the optical member 114 is thus obtained (FIG. 15 and FIG. 16).

The micro lens substrate 200 of the present example and its method of manufacture achieve the same effect as that achieved by the optical component of the present preferred embodiment and its method of manufacture.

Example 2

1. Micro Lens Substrate Structure

Figure 19:
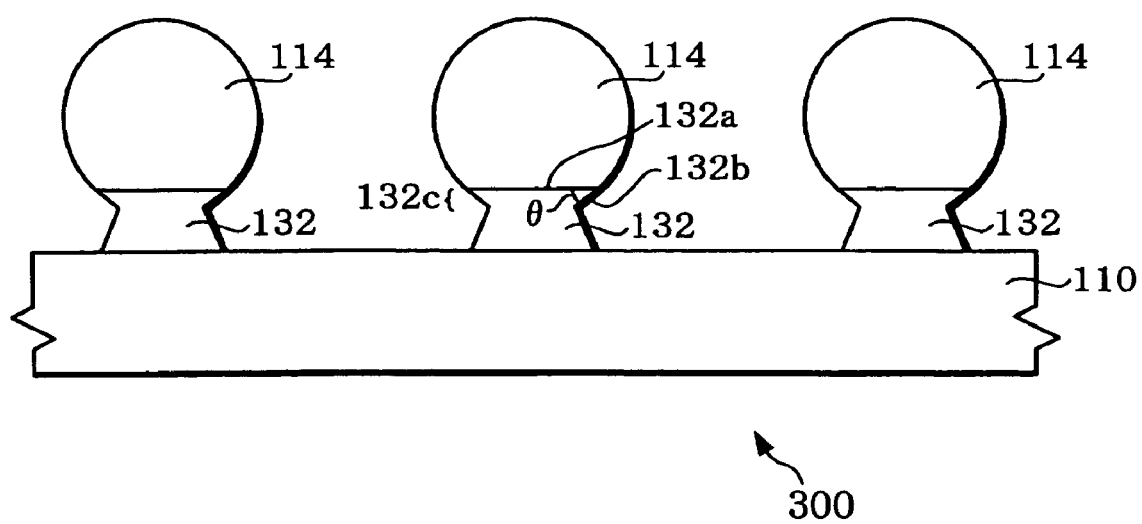
FIG. 19 is a sectional view that schematically shows the micro lens substrate of one example of the present exemplary embodiment.
Figure 20:
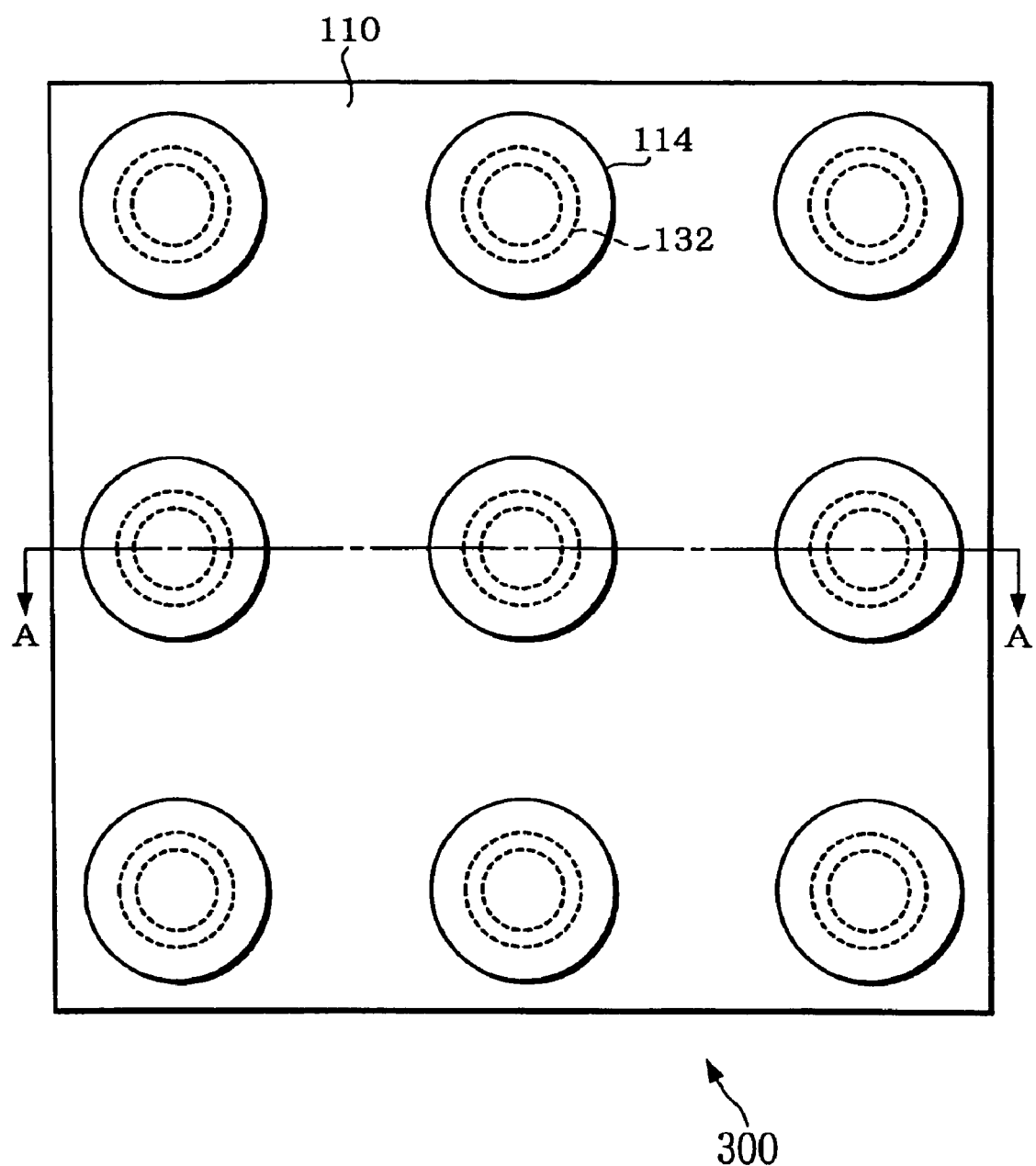
FIG. 20 is a plan view that schematically shows the micro lens substrate shown in FIG. 19.

FIG. 19 is a sectional view that schematically shows a micro lens substrate 300 of Example 2. FIG. 20 is a plan view that schematically shows the micro lens substrate 300 shown in FIG. 19. Moreover, FIG. 19 schematically shows a cross-section along plane A—A in FIG. 20.

The micro lens substrate 300 of the present example is structurally different from that of the micro lens substrate 200 of Example 1 in that base members 132 have an awning-type shape.

However, the other constituent elements are structurally the same as those in the micro lens substrate 200 of Example 1, so their description is omitted here.

The base members 132, like the base members 112 of Example 1, consist of a polyimide resin. As shown in FIG. 19 and FIG. 20, the base members 132 have an awning-type shape. In other words, a upper part 132c of the base members 132 is formed in an inverse tapered shape. In this case, an acute angle θ is formed between the base member's 132 top surface 132a and its side surface 132b (the surface within the side member of the base member 132 that is adjacent to the top surface 132a). According to this configuration, the angle θ formed between the base member's top surface 132a and side surface 132 can by made smaller. This can reliably prevent the side surface 132b of the base member 132 from being wetted by droplets and, thus, the optical member 114 having the desired shape and size can be reliably formed.

2. A Method of Manufacturing a Micro Lens Substrate

Figure 21:
FIG. 21(a)–FIG. 21(e) are sectional views that schematically show the process of manufacturing the micro lens substrate shown in FIG. 19 and FIG. 20, respectively.
Figure 21:
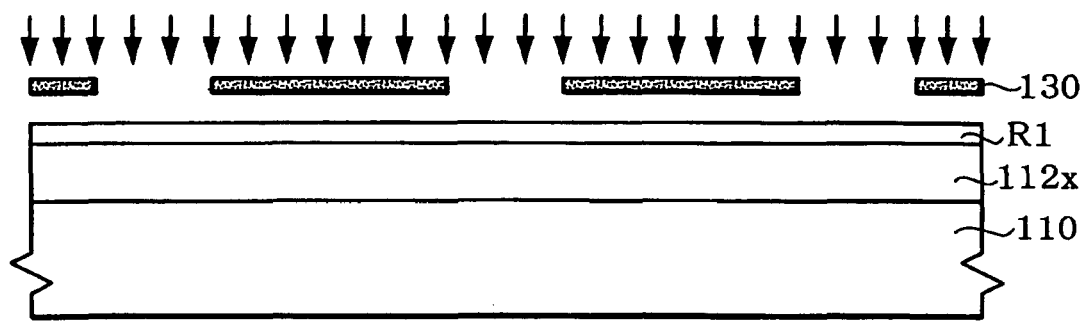
Figure 21:
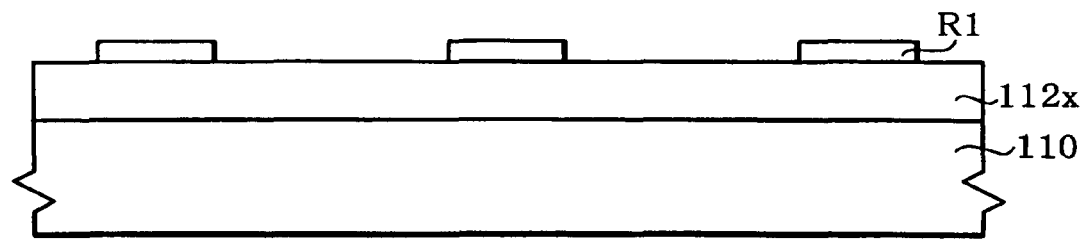
Figure 21:
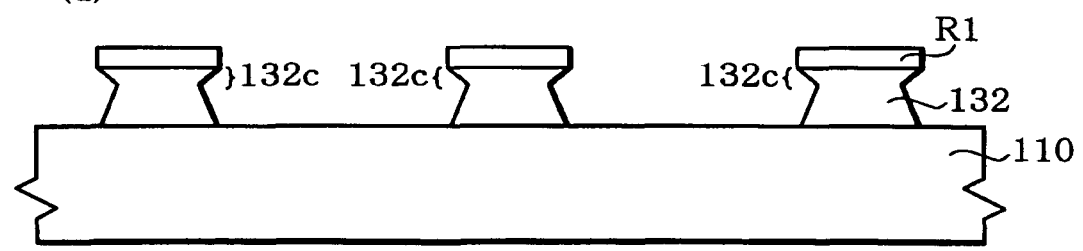
Figure 21:
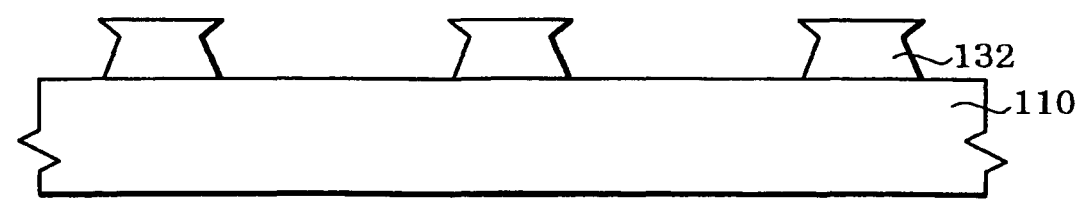

Next, a method for manufacturing the micro lens substrate 300 of the present example is described. FIG. 21(a)–to FIG. 21(e) are sectional views that schematically show the process of manufacturing the micro lens substrate 300 shown in FIG. 19 and FIG. 20, respectively.

The method of manufacturing the micro lens substrate 300 of the present example is the same as the method of manufacturing the micro lens substrate 200 of Example 1, except for a step of patterning the base member 132. For this reason, the following description primarily concerns the step for patterning the base member 132.

First, after the resin layer 112x is formed on the substrate 10, which consists of a glass substrate, the resist layer R1 of a prescribed pattern is formed [FIG. 21(a)–to FIG. 21(c)]. The steps up to this point are the same as those in the manufacturing method described in Example 1.

The substrate 10 is then heat treated at a temperature (130° C., for example) that is just low enough not to change the properties of the resist. In this heat treatment, it is preferable to cure the top side of the resin layer 112x (the resist layer R1 side) to a greater degree than the part of the resin layer 112x nearer the substrate 110, by applying heat from the top side of the resin layer 112x.

Next, the resin layer 112x is wet-etched, using the resist layer R1 as a mask. In this step, the region directly beneath the resist layer, that is, the top part of the resin layer 112x, is more resistant to etching, because the etchant penetrates more slowly here than in other regions. Moreover, the top side portion of the resin layer 112x is cured to a greater degree by the heat treatment than is the substrate 110 side portion. Therefore, the wet-etch rate of the top side portion of the resin layer 112x is slower than that of the substrate 110 side portion. Since the wet-etch rate of the top side portion of the resin layer 112x is thus slower than that of the substrate 110 side portion during the wet-etching step, more of the top side portion of the resin layer 112x remains compared to the substrate 110 side portion. A base member 132 in which the top portion 132c forms an inverse-tapered shape is thereby obtained [FIG. 21(d)]. Next, the resist layer R1 is stripped [FIG. 21(e)].

The subsequent steps are the same as those in the manufacturing method described in Example 1. The micro lens substrate 300 is thereby obtained (FIG. 19 and FIG. 20).

The micro lens substrate 300 of the present example and its method of manufacture achieve the same effect as that of the optical component of the present exemplary embodiment and its method for manufacture.

Example 3

1. Micro Lens Substrate Structure

Figure 22:
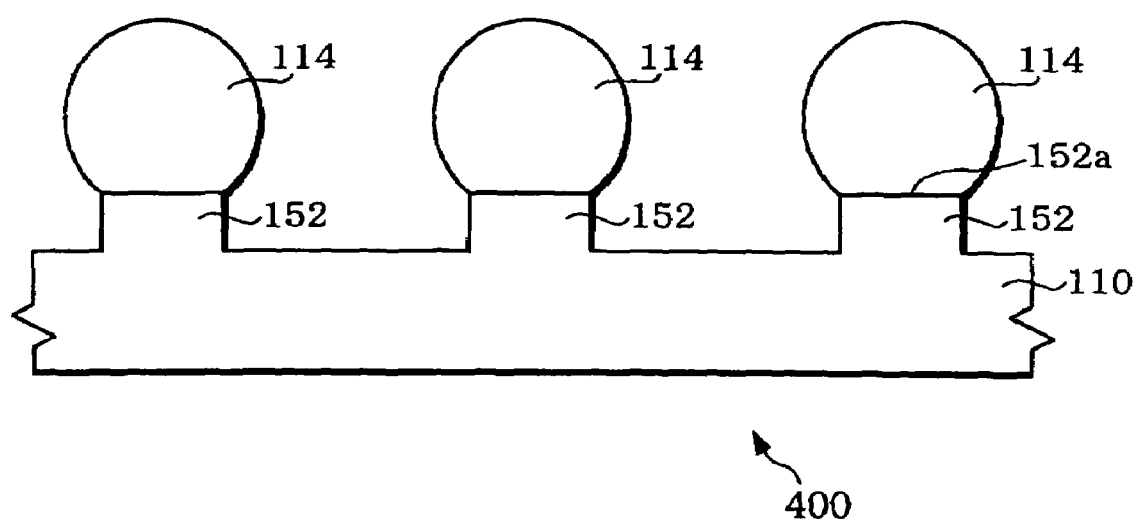
FIG. 22 is a sectional view that schematically shows the micro lens substrate of one example of the present exemplary embodiment.
Figure 23:
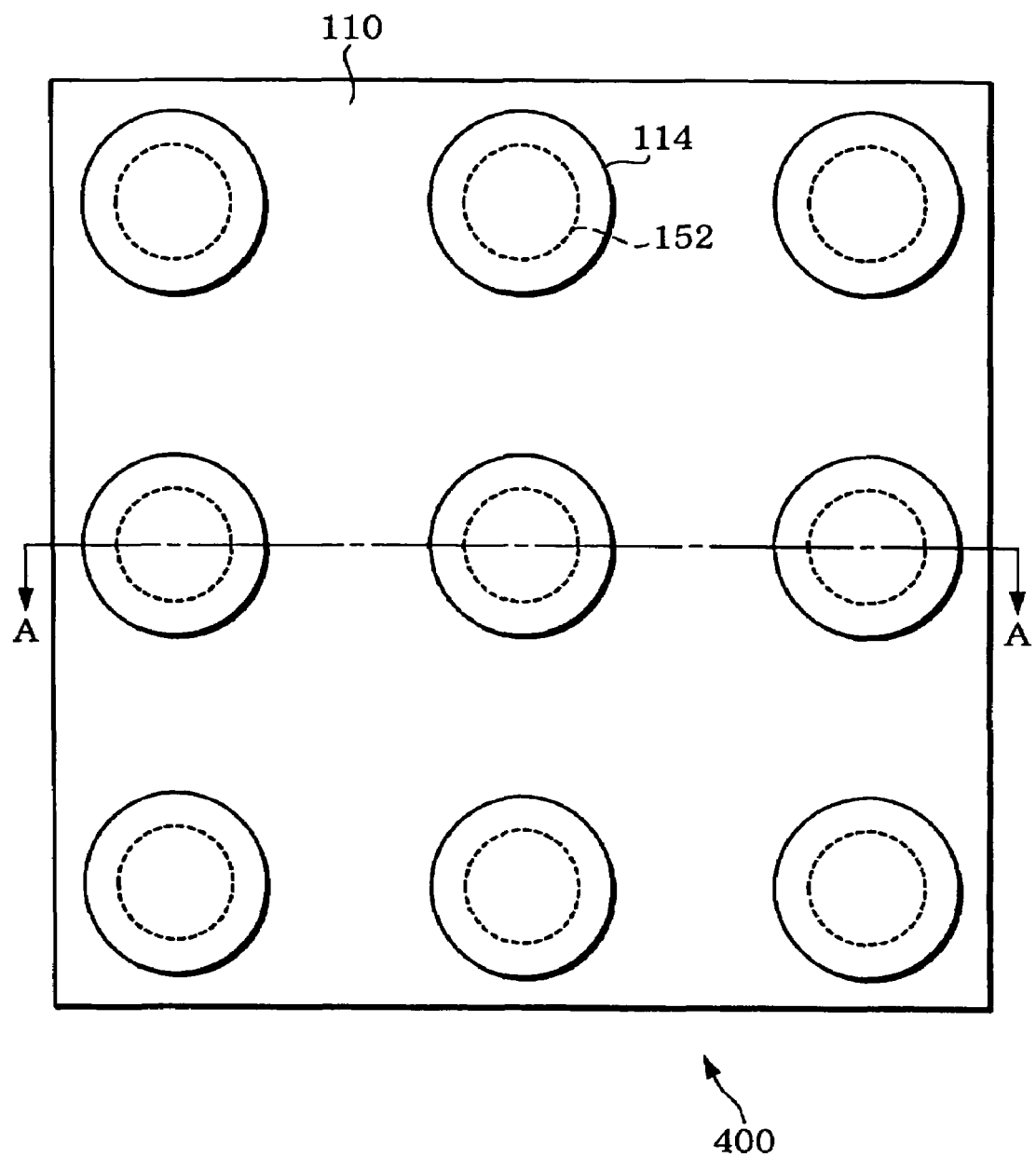
FIG. 23 is a plan view that schematically shows the micro lens substrate shown in FIG. 22.

FIG. 22 is a sectional view that schematically shows a micro lens substrate 400 of Example 1. FIG. 23 is a plan view that schematically shows the micro lens substrate 400 shown in FIG. 22. Moreover, FIG. 22 schematically shows a cross-section along plane A—A in FIG. 23.

As shown in FIG. 22, the micro lens substrate 400 of the present example has a configuration that differs from that in Example 1 in that a base member 152 is formed so that it is integrated with the substrate 110 and is made from the same material (a glass substrate) as the substrate 110. However, the other constituent elements are structurally the same as those in the micro lens substrate 200 of Example 1, so their description is omitted here.

2. A Method of Manufacturing a Micro Lens Substrate

Figure 24:
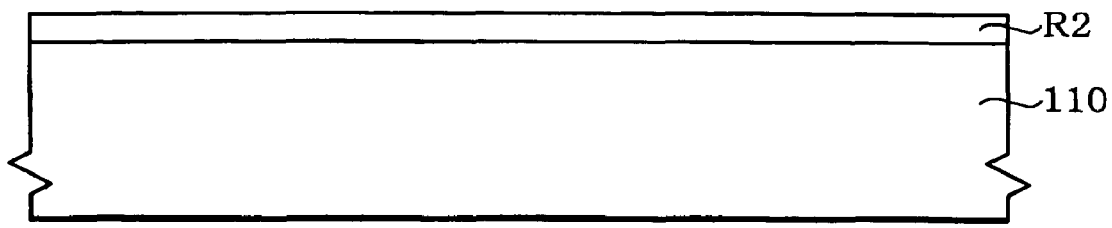
FIG. 24(a)–FIG. 24(e) are sectional views that schematically show the process of manufacturing the micro lens substrate shown in FIG. 22 and FIG. 23, respectively.
Figure 24:
Figure 24:
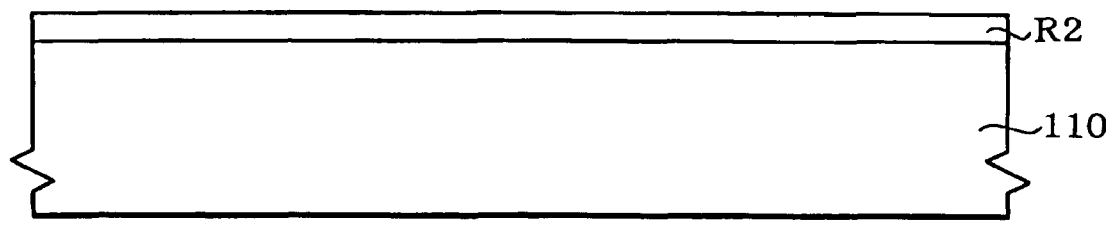
Figure 24:
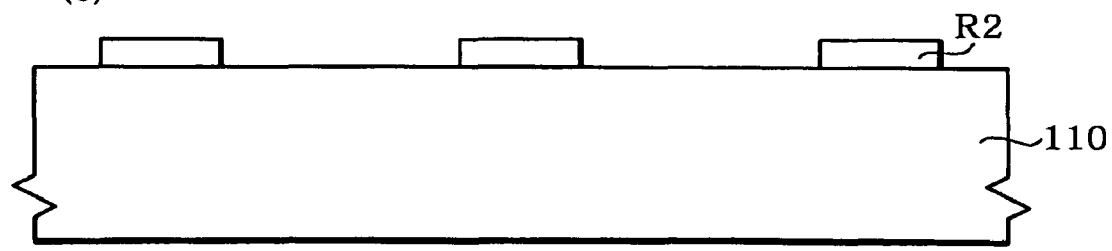
Figure 24:
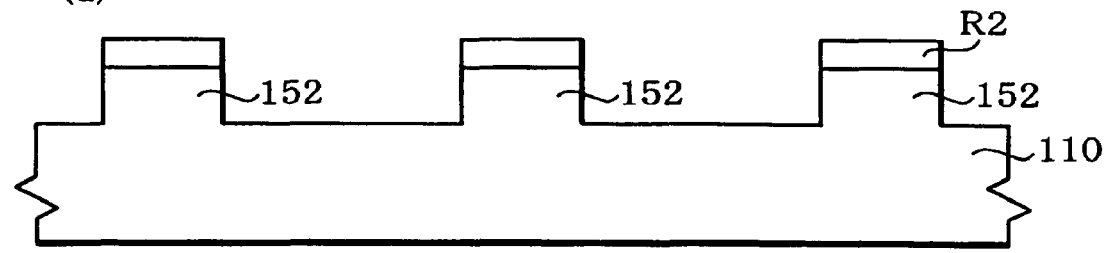
Figure 24:
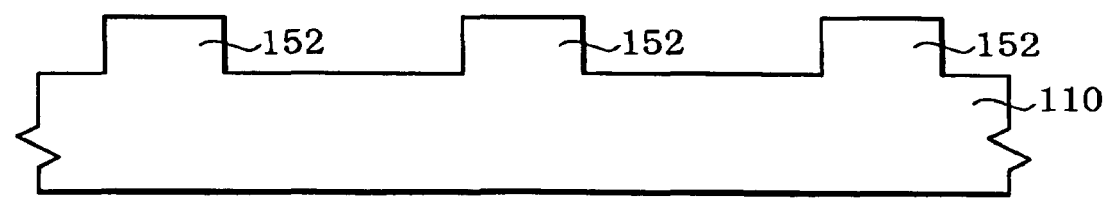

Next, the method of manufacturing the micro lens substrate 400 of the present example is described. FIG. 24(*a*)–to FIG. 24(*e*) are sectional views that schematically show the process of manufacturing the micro lens substrate 400 shown in FIG. 22 and FIG. 23, respectively.

First, a dry film resist (DFR) is laminated on the substrate 110, which consists of a glass substrate [FIG. 24(*a*)].

Then, a photolithography step is performed using a mask 230 of the prescribed pattern [FIG. 24(*b*)]. A resist layer R2 of the prescribed pattern is thereby formed [FIG. 24(*c*)].

Next, the substrate 110, which consists of a glass substrate, is patterned, using the resist layer R2 as a mask [FIG. 24(*d*)]. This patterning thus forms the base members 152 so that they are integrated with the substrate 110. In other words, the adjacent base members 152 are separated by a channel.

Examples of possible patterning methods include wet etching with hydrofluoric acid, ion beam etching, micro fabrication with a laser, sandblasting, and so forth. For patterning relatively large areas, sandblasting is among the more effective techniques. Sandblasting, a technique wherein etching is performed by blasting the work piece with particles whose diameter ranges from 1 micron to several tens of microns, can obtain resolutions of about 20 microns. Examples of materials that can be used as particles in sandblasting are SiC and $AlO_2$ and so forth. Next, the resist layer R2 is stripped [FIG. 24(*e*)].

The subsequent steps are the same as those in the manufacturing method described in Example 1. The micro lens substrate 400 is thereby obtained (FIG. 22 and FIG. 23).

The micro lens substrate 400 of the present example and its method of manufacture achieves the same effect as that of the optical component of the present exemplary embodiment and its method for manufacture.

Example 4

1. A Method for Removing the Optical Members 114

Figure 25:
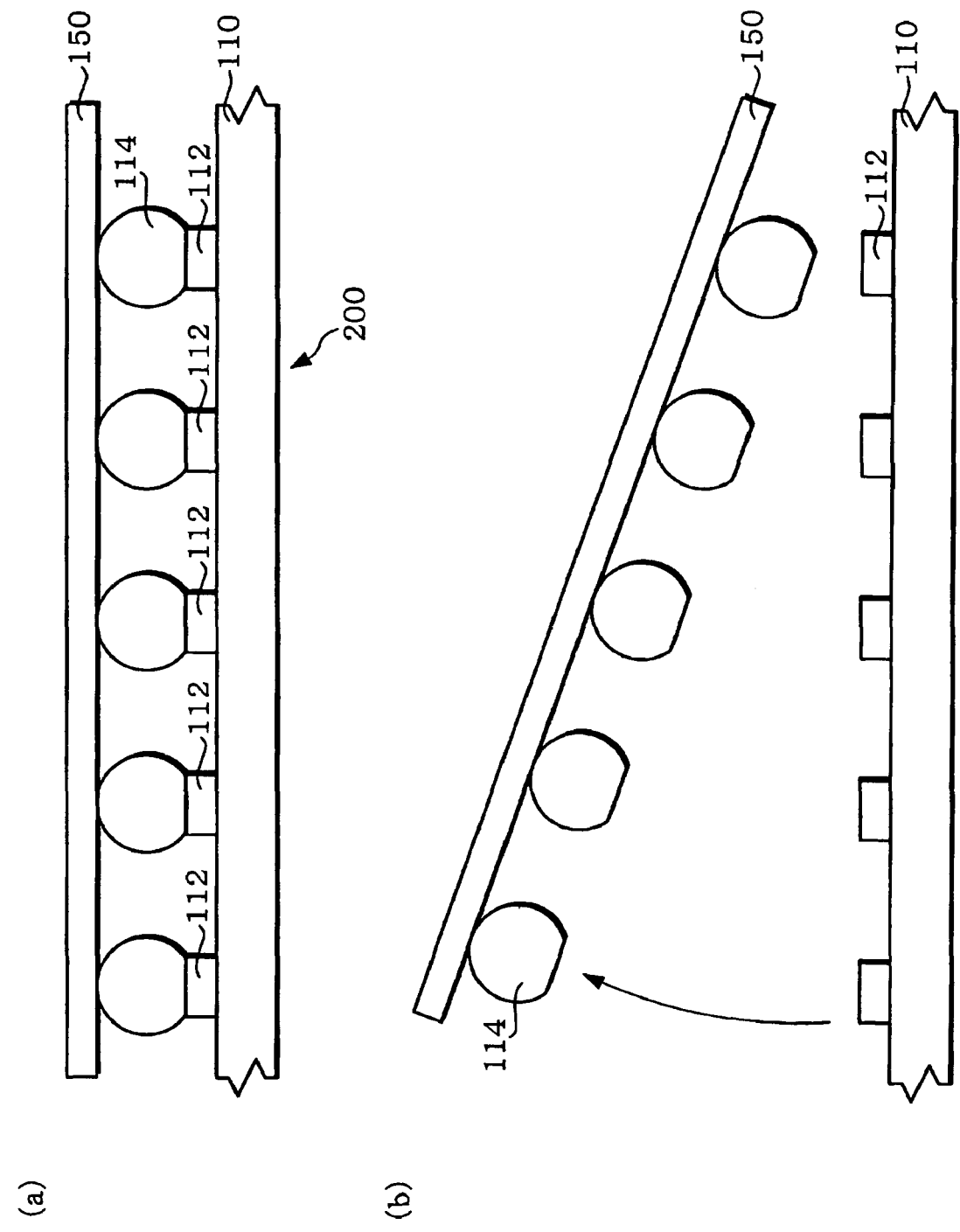
FIG. 25(a) and FIG. 25(b) are sectional views that respectively schematically show a method of removing the optical members of on example of the present exemplary embodiment.

Example 4 describes a method of removing the optical members 14 from the micro lens substrate 200 obtained in Example 1. FIG. 25(*a*) and FIG. 25(*b*) are sectional views that respectively schematically show a method for removing the optical members 114 of the present example. The removed optical members 114 can be used independently as a part of another device. Specifically, the optical member 114 can be used as a ball lens, as a part of another device.

First, an adhesive sheet 150 is placed on the optical members 114 of the micro lens substrate 200 of Example 1 [FIG. 25(*a*)]. Then, the optical members 114 are removed from the base member 112 by pulling off the adhesive sheet 150 [FIG. 25(*b*)]. The optical members 114 can be removed by the aforesaid process. If the top surface 112*a* of the base member 112 here is pre-treated with a repellant liquid, removal is facilitated.

In addition, the present example describes a method of removing the optical members 114 from the micro lens substrate 200 of Example 1. However, the method of the present example may also be used to remove the optical members 114 from the micro lens substrates 300, 400 of Examples 2 and 3.

Moreover, the present example describes a method of removing optical members that function as lenses from the micro lens substrate. However, a method similar to that in the present example may also be used for instances where optical members having functions other than those of lenses are to be removed from the optical component.

What is claimed is:

1. A method of manufacturing an optical component, comprising:
   forming a base member upon a substrate, the base member being elevated from the substrate;
   ejecting a plurality of droplets onto a top surface of the base member to form an optical member precursor on the top surface of the base member; and
   forming an optical member on the top surface of the base member by curing the optical member precursor.

2. The method of manufacturing an optical component according to claim 1, the forming including forming the base member with a material that transmits light of a prescribed wavelength.

3. The method of manufacturing an optical component according to claim 1, the ejecting including ejecting using an inkjet method.

4. The method of manufacturing an optical component according to claim 1, the curing including curing the optical member precursor by adding energy.

5. The method of manufacturing an optical component according to claim 1, the forming including forming the base member so that an acute angle is formed between the top surface of the base member and a side surface in the base member, which contacts the top surface.

6. The method of manufacturing an optical component according to claim 1, the forming including forming an upper part of the base member in an inverse tapered shape.

7. The method of manufacturing an optical component according to claim 1, further comprising adjusting a wettability of the top surface of the base member with respect to the droplets, before the ejecting.

8. The method of manufacturing an optical component according to claim 1, the optical member being a micro lens, and the optical component being a micro lens substrate.

9. The method of manufacturing an optical component according to claim 1, further comprising embedding a perimeter of the optical member using a sealing material.

10. A method of manufacturing an optical component, comprising:
    forming a base member upon a substrate, the base member being elevated from the substrate;
    ejecting a droplet onto a top surface of the base member to form an optical member precursor on the top surface of the base member;
    forming an optical member on the top surface of the base member by curing the optical member precursor; and
    removing the optical member from the top surface of the base member.

11. The method of manufacturing an optical component according to claim 10, the forming including forming the base member with a material that transmits light of a prescribed wavelength.

12. A method of manufacturing a micro lens substrate, comprising:
    forming a base member upon a substrate, the base member being elevated from the substrate;
    ejecting a droplet onto a top surface of the base member to form a lens precursor on the top surface of the base member; and
    forming a lens on the top surface of the base member by curing the lens precursor.

13. The method of manufacturing a micro lens substrate according to claim 12, the forming including forming the base member with a material that transmits light of a prescribed wavelength.

14. The method of manufacturing an optical component according to claim 1, the optical member capable of transmitting light of a prescribed wavelength.

15. The method of manufacturing an optical component according to claim 10, the optical member capable of transmitting light of a prescribed wavelength.

16. The method of manufacturing a microlens substrate according to claim 12, the optical member capable of transmitting light of a prescribed wavelength.

17. The method of manufacturing an optical component according to claim 1, the optical member being a lens, a maximum diameter of the optical member being greater than a diameter of a bottom surface of the optical member.

18. The method of manufacturing an optical component according to claim 1, the droplets being made of a material that is different from a material of the base member.

19. The method of manufacturing an optical component according to claim 1, a diameter of a bottom side surface of the optical member being equal to a diameter of the top surface of the base member.

20. The method of manufacturing a microlens substrate according to claim 12, the droplets being made of a material that is different from a material of the base member.

* * * * *